US012757133B2

(12) United States Patent
Wu et al.

(10) Patent No.: US 12,757,133 B2
(45) Date of Patent: Oct. 6, 2026

(54) SYNCHRONIZATION METHOD, DEVICES, EQUIPMENT AND COMPUTER READABLE STORAGE MEDIA

(71) Applicant: Samsung Electronics Co., Ltd., Gyeonggi-do (KR)

(72) Inventors: Min Wu, Beijing (CN); Feifei Sun, Beijing (CN); Qi Xiong, Beijing (CN)

(73) Assignee: Samsung Electronics Co., Ltd (KR)

( * ) Notice: Subject to any disclaimer, the term of this patent is extended or adjusted under 35 U.S.C. 154(b) by 603 days.

(21) Appl. No.: 17/560,868

(22) Filed: Dec. 23, 2021

(65) Prior Publication Data

US 2022/0201631 A1 Jun. 23, 2022

(30) Foreign Application Priority Data

Dec. 23, 2020 (CN) ........................ 202011546293.5

(51) Int. Cl.
*H04W 56/00* (2009.01)

(52) U.S. Cl.
CPC ... *H04W 56/0005* (2013.01); *H04W 56/0045* (2013.01)

(58) Field of Classification Search
None
See application file for complete search history.

(56) References Cited

U.S. PATENT DOCUMENTS

| | | | | |
|---|---|---|---|---|
| 11,672,007 B2 * | 6/2023 | Lei | H04W 56/0045 | 370/329 |
| 2009/0180435 A1 | 7/2009 | Sarkar | | |
| 2011/0176479 A1 * | 7/2011 | Booton | H04B 7/18513 | 370/321 |
| 2014/0198757 A1 * | 7/2014 | Kim | H04W 56/0045 | 370/329 |

(Continued)

OTHER PUBLICATIONS

International Search Report dated Apr. 1, 2022 issued in counterpart application No. PCT/KR2021/019722, 10 pages.

(Continued)

*Primary Examiner* — Wutchung Chu
*Assistant Examiner* — Berhanu D Belete
(74) *Attorney, Agent, or Firm* — The Farrell Law Firm, P.C.

(57) ABSTRACT

The present disclosure relates to a pre-5th generation (5G) or 5G communication system to be provided for supporting higher data rates beyond 4th generation (4G) communication system such as long term evolution (LTE). The disclosure provides a synchronization method, apparatus, device and computer readable storage medium, the method being performed by a user device UE. A method includes transmitting a first portion of repetitions of an uplink transmission based on a first value of an uplink synchronization parameter, the first portion of repetitions including a single repetition or multiple repetitions; determining a second value of the uplink synchronization parameter by adjusting the first value of the uplink synchronization parameter; and (Continued)

transmitting a second portion of repetitions of the uplink transmission based on the second value of the uplink synchronization parameter, the second portion of repetitions including a single repetition or multiple repetitions.

20 Claims, 31 Drawing Sheets

(56) References Cited

U.S. PATENT DOCUMENTS

2015/0043412 A1* 2/2015 Womack ............... H04W 72/21 370/311
2015/0334707 A1* 11/2015 Rajagopalan ....... H04W 56/004 370/336
2016/0066292 A1* 3/2016 Womack ............... H04L 5/0048 370/350
2017/0149494 A1* 5/2017 Meng ................... H04B 7/2662
2017/0149552 A1 5/2017 Vejlgaard et al.
2017/0303224 A1 10/2017 Choi et al.
2017/0373907 A1* 12/2017 Tan ........................... H04L 5/14
2018/0097679 A1* 4/2018 Zhang ................. H04L 27/2607
2018/0167172 A1* 6/2018 Hosseini ........... H04W 72/1215
2019/0174523 A1* 6/2019 Wang .................... H04L 5/0055
2019/0306812 A1 10/2019 Sengupta et al.
2019/0363843 A1* 11/2019 Gordaychik .......... H04L 1/1896
2020/0083925 A1* 3/2020 Zhou ..................... H04W 72/54
2020/0120671 A1 4/2020 Axmon et al.
2020/0213066 A1* 7/2020 Ma ........................ H04W 24/02
2020/0245317 A1* 7/2020 Hwang ................. H04W 72/23
2020/0267756 A1* 8/2020 Fakoorian ............. H04L 5/0094
2020/0404655 A1* 12/2020 Salem ................... H04W 16/14
2021/0029658 A1* 1/2021 Mahalingam ..... H04W 56/0045
2021/0112540 A1* 4/2021 Zewail .................. H04W 72/23
2022/0007455 A1* 1/2022 Hong ................ H04W 74/0833
2022/0078841 A1* 3/2022 Tiirola ................ H04W 74/006
2022/0078854 A1* 3/2022 Xiong ............... H04W 74/0841
2022/0116898 A1* 4/2022 Ying ................. H04W 56/0005
2022/0150858 A1* 5/2022 Ren ..................... H04L 27/2607
2022/0256469 A1* 8/2022 Khan .................... H04W 52/54
2022/0303906 A1* 9/2022 Khan ................ H04W 52/0277
2024/0155608 A1* 5/2024 Park ...................... H04L 1/1812

OTHER PUBLICATIONS

ZTE, "Discussion on the Enhancement of NTN", R1-2003560, 3GPP TSG RAN WG1 #101, May 25-Jun. 5, 2020, 6 pages.
European Search Report dated May 10, 2024 issued in counterpart application No. 21911573.0-1206, 7 pages.

* cited by examiner

FIG. 17 by means of configuring the cell common TA, the TA values used by all UEs in the cell for uplink transmission, are controlled to be within a range of k×10ms~(k×10ms+GP), or the TA values are controlled to be within a range of k×5ms~(k×5ms+GP); wherein, the TA value used by the UE for uplink transmission is the sum of the true TA and the cell common TA, k is a positive integer, and GP is the length in time of the guard interval contained within the special subframe of the TDD system

Figure 17:
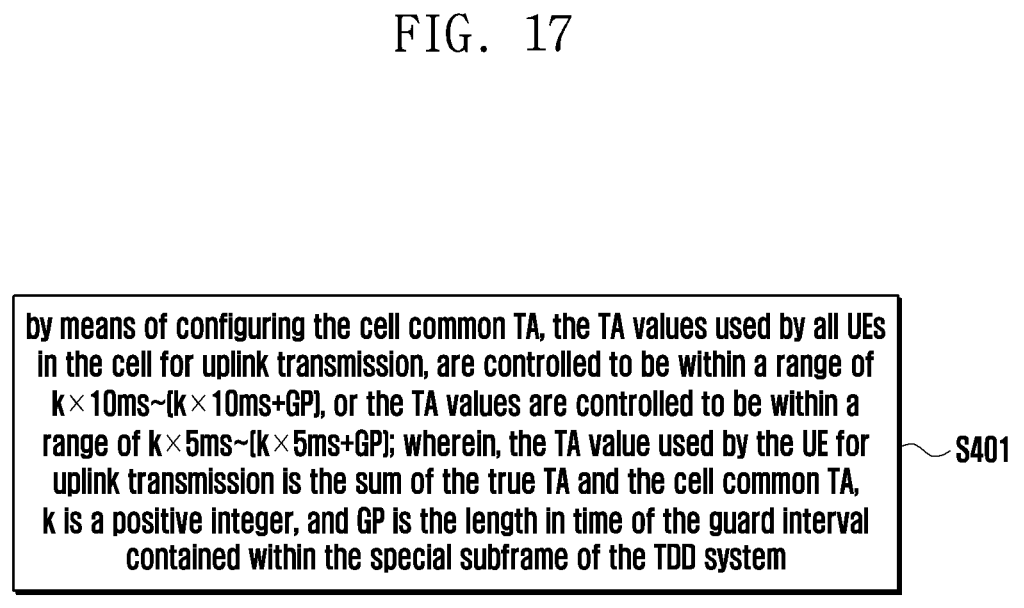

S401

SYNCHRONIZATION METHOD, DEVICES, EQUIPMENT AND COMPUTER READABLE STORAGE MEDIA

CROSS-REFERENCE TO RELATED APPLICATION(S)

This application is based on and claims priority under 35 U.S.C. § 119(a) to Chinese Patent Application No. 202011546293.5, which was filed in the China National Intellectual Property Administration on Dec. 23, 2020, the entire disclosure of which is incorporated herein by reference.

BACKGROUND

1. Field

The disclosure relates generally to the field of wireless communication technology, and more specifically, to synchronization methods and user equipments (UEs) for performing the synchronization methods.

2. Description of Related Art

To meet the increasing demand for wireless data communication services since the deployment of $4^{th}$ generation (4G) communication systems, efforts have been made to develop improved $5^{th}$ generation (5G) or pre-5G communication systems. 5G or pre-5G communication systems may also be referred to as "beyond 4G networks" or "post-long term evolution (LTE) systems".

5G communication systems are implemented in higher frequency (mmWave) bands, such as 60 GHz band, to achieve higher data rates. To reduce propagation loss of radio waves and increase transmission distance, beamforming, massive multiple-input multiple-output (MIMO), full-dimensional MIMO (FD-MIMO), array antennas, analog beamforming, and large-scale antenna techniques are current being discussed for use in the 5G communication systems.

In addition, development of system network improvements based on advanced small cells, cloud radio access networks (RAN), ultra-dense networks, device-to-device (D2D) communications, wireless backhaul, mobile networks, collaborative communications, coordinated multi-point (CoMP), and interference cancellation at the receiving end are underway in 5G communication systems.

In the 5G communication systems, hybrid frequency shift keying (FSK) and quadrature amplitude modulation (QAM) (FQAM) and sliding window superposition coding (SWSC) have been developed as advanced coded modulation (ACM) techniques, and filter bank multicarrier (FBMC), non-orthogonal multiple access (NOMA), and sparse code multiple access (SCMA) have been developed as advanced access technologies.

SUMMARY

An aspect of the disclosure is to provide a synchronization method, device, equipment, and computer-readable storage medium for maintaining synchronization during transmission, in response to the shortcomings of existing methods.

In accordance with an aspect of the disclosure, a method is provided for a UE to perform synchronization. The method includes transmitting a first portion of repetitions of an uplink transmission based on a first value of an uplink synchronization parameter, the first portion of repetitions including a single repetition or multiple repetitions; determining a second value of the uplink synchronization parameter by adjusting the first value of the uplink synchronization parameter; and transmitting a second portion of repetitions of the uplink transmission based on the second value of the uplink synchronization parameter, the second portion of repetitions including a single repetition or multiple repetitions In accordance with another aspect of the disclosure, a method is provided for a UE to perform synchronization. The method includes receiving a first portion of repetitions of a downlink transmission based on a first value of a downlink synchronization parameter, the first portion of repetitions including a single repetition or multiple repetitions; determining a second value of the downlink synchronization parameter by adjusting the first value of the downlink synchronization parameter; and receiving a second portion of repetitions of the downlink transmission based on a second value of the downlink synchronization parameter, the second portion of repetitions including a single repetition or multiple repetitions.

In accordance with another aspect of the disclosure, a method is provided for a half-duplex UE to perform synchronization. The method includes switching, by the UE, from an uplink transmission to a downlink transmission during one or more gaps of the uplink transmission, wherein the UE has no uplink transmission and is not required to monitor a physical downlink control channel during the one or more gaps; receiving a downlink synchronization reference signal for acquiring or tracking a downlink synchronization; and after acquiring or tracking the downlink synchronization, switching back from the downlink transmission to the uplink transmission to continue the uplink transmission. The downlink synchronization reference signal includes at least one of a primary synchronization signal (PSS), a secondary synchronization signal (SSS), and a resynchronization reference signal (RRS).

In accordance with another aspect of the disclosure, a method is provided for a half-duplex UE to perform synchronization. The method includes upon completing an uplink transmission, switching from the uplink transmission to a downlink transmission; and receiving, by the UE, a downlink synchronization reference signal for acquiring or tracking a downlink synchronization during a predetermined time. The UE is not required to monitor a physical downlink control channel during the predetermined time, and the downlink synchronization reference signal includes at least one of a cell reference signal (CRS), a primary synchronization signal (PSS), a secondary synchronization signal (SSS), and a resynchronization reference signal (RRS).

In accordance with another aspect of the disclosure, a user equipment is provided, which includes a processor; and a memory configured to store machine-readable instructions that, when executed by the processor, causes the processor to transmit a first portion of repetitions of an uplink transmission based on a first value of an uplink synchronization parameter, the first portion of repetitions including a single repetition or multiple repetitions determine a second value of the uplink synchronization parameter by adjusting the first value of the uplink synchronization parameter; and transmit a second portion of repetitions of the uplink transmission based on the second value of the uplink synchronization parameter, the second portion of repetitions including a single repetition or multiple repetitions.

In accordance with another aspect of the disclosure, a non-transitory computer readable storage medium is provided, that stores a computer program, which is executed by a processor to transmit a first portion of repetitions of an uplink transmission based on a first value of an uplink synchronization parameter, the first portion of repetitions including a single repetition or multiple repetitions; determine a second value of the uplink synchronization parameter by adjusting the first value of the uplink synchronization parameter; and transmit a second portion of repetitions of the uplink transmission based on the second value of the uplink synchronization parameter, the second portion of repetitions including a single repetition or multiple repetitions.

BRIEF DESCRIPTION OF THE DRAWINGS

The above and other objects, features, and advantages of the present disclosure will be more apparent from the following description of embodiments of the present disclosure with reference to the accompanying drawings, in which:

FIG. 17 is a flowchart illustrating a synchronization method for a time division duplex (TDD) system according to an embodiment;

DETAILED DESCRIPTION

Various embodiments of the disclosure are described in detail below, and examples of the embodiments are shown in the accompanying drawings, wherein the same or similar designations may indicate the same or similar components or components having the same or similar functions. The embodiments described below by reference to the accompanying drawings are exemplary and are intended to explain the disclosure, without limiting the disclosure.

The steps, measures, and schemes in the various operations, methods, and processes described in the disclosure may be alternated, changed, combined, or deleted. Individual steps and individual schemes in the disclosure can be combined with each other; some of the steps in an embodiment of the disclosure can also be combined into a new scheme without all of the steps in that embodiment.

Singular forms "a", "an", "the", and "said" may be intended to include plural forms as well, unless otherwise stated. Further, the terms "include" and "including" used in this disclosure specify the presence of the stated features, integers, steps, operations, elements and/or components, but do not exclude the presence or addition of one or more other features, integers, steps, operations, elements, components, and/or combinations thereof.

When a component is referred to as being "connected to" or "coupled to" another component, it may be directly connected or coupled to other elements or provided with intervening elements therebetween. In addition, "connected to" or "coupled to" as used herein may include wireless connection or coupling.

As used herein, term "and/or" includes all or any of one or more associated listed items or combinations thereof.

Figure 1:
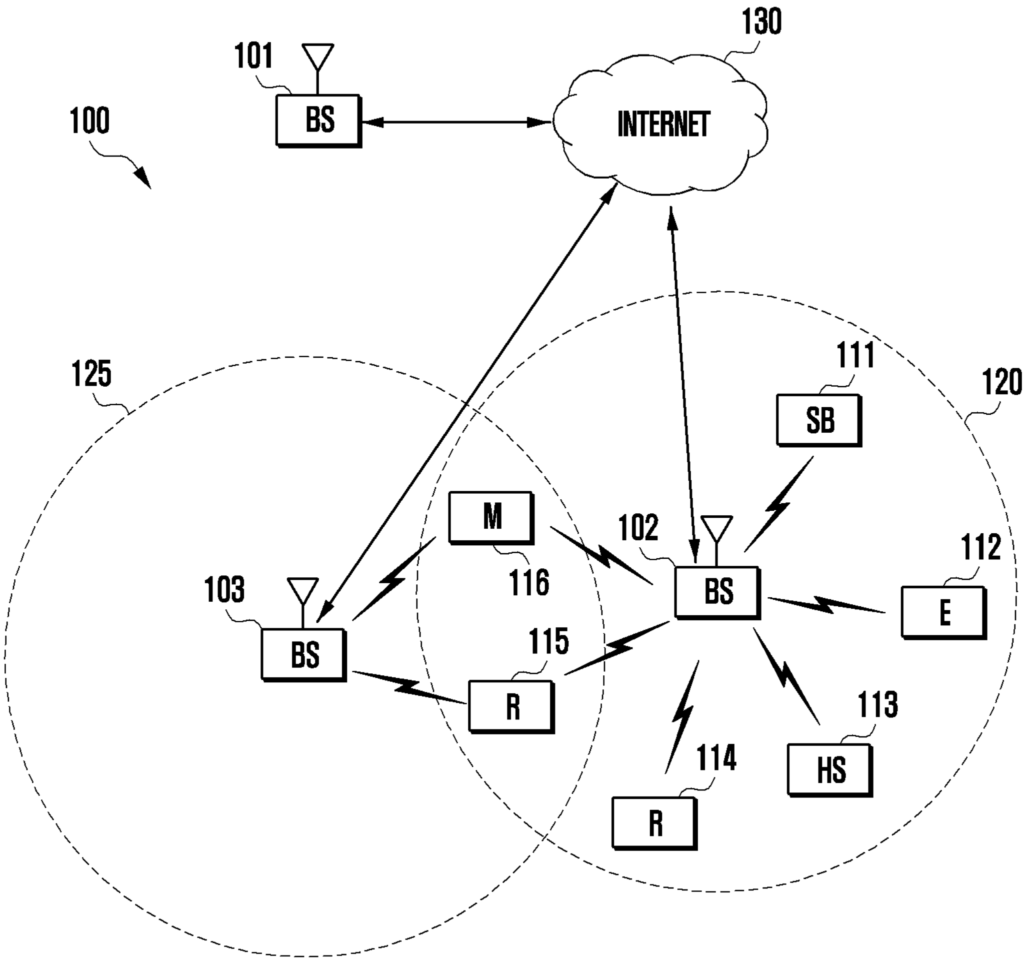
FIG. 1 illustrates a wireless network according to an embodiment.

FIG. 1 illustrates a wireless network according to an embodiment.

Referring to FIG. 1, a wireless network 100 includes a BS 101, a BS 102, and a BS 103. The BS 101 communicates with the BS 102 and the BS 103. The BS 101 also communicates with at least one Internet protocol (IP) network 130, such as the Internet, a proprietary IP network, or another data network.

For convenience, the term "BS" is used herein to refer to a network infrastructure component that provides wireless access to remote devices, and the term "UE" is used herein to refer to a remote device for wireless access to a BS, whether the UE is a mobile device (e.g., a mobile telephone or smartphone) or is normally considered a stationary device (e.g., a desktop computer or vending machine). However, depending on the type of network, the term BS may be replaced with other well-known terms such as "gNodeB (gNB)" or "access point (AP)". Similarly, depending on the type of network, other well-known terms such as "mobile station (MS)", "user station", "remote terminal", "wireless terminal", and "user device" can be used instead of "UE".

The BS 102 provides wireless broadband access to the network 130 for a first plurality of UEs within a coverage area 120 of the BS 102. The first plurality of UEs includes a UE 111, which may be located in a small business (SB), a UE 112, which may be located in an enterprise (E), a UE 113, which may be located in a WiFi hotspot (HS), a UE 114, which may be located in a first residence (R), a UE 115, which may be located in a second R, and a UE 116, which may be a mobile device (M), such as a cell phone, a wireless laptop, a wireless personal digital assistant (PDA), etc. The BS 103 provides wireless broadband access to the network 130 for a second plurality of UEs within a coverage area 125 of the BS 103. The second plurality of UEs includes the UE 115 and the UE 116. One or more of the BSs 101-103 may communicate with each other and with the UEs 111-116 using 5G, LTE, LTE-advanced (LTE-A), WiMAX, WiFi, or other wireless communication techniques.

The coverage areas 120 and 125 associated with BSs 102 and 103 may have other shapes, including irregular shapes, depending upon the configuration of the BSs 102 and 103 and variations in the radio environment associated with natural and man-made obstructions.

One or more of the BSs 101, 102, and 103 may include a 2-dimensional (2D) antenna array. Further, one or more of the BSs 101, 102, and 103 may support a codebook design and architecture for a system having a 2D antenna array.

Although FIG. 1 illustrates one example of a wireless network, various changes may be made to the wireless network. For example, the wireless network could include any number of BSs and any number of UEs in any suitable arrangement. Also, the BS 101 could communicate directly with any number of UEs and provide those UEs with wireless broadband access to the network 130. Similarly, each of BSs 102 and 103 could communicate directly with the network 130 and provide UEs with direct wireless broadband access to the network 130. Further, the BSs 101, 102, and/or 103 could provide access to other or additional external networks, such as external telephone networks or other types of data networks.

Figure 2A:
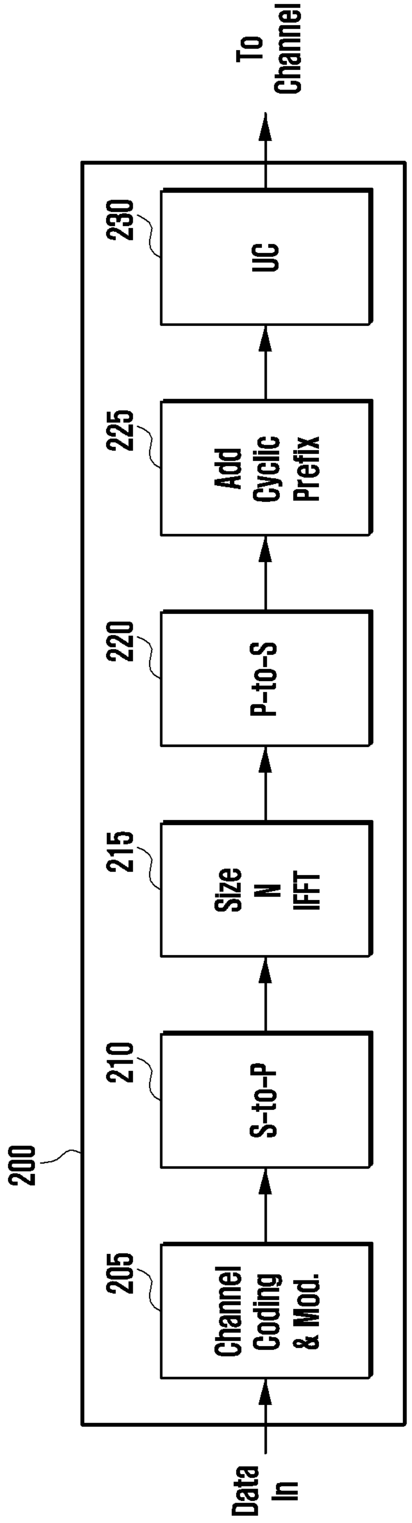
FIG. 2A illustrates a transmit path according to an embodiment.
Figure 2B:
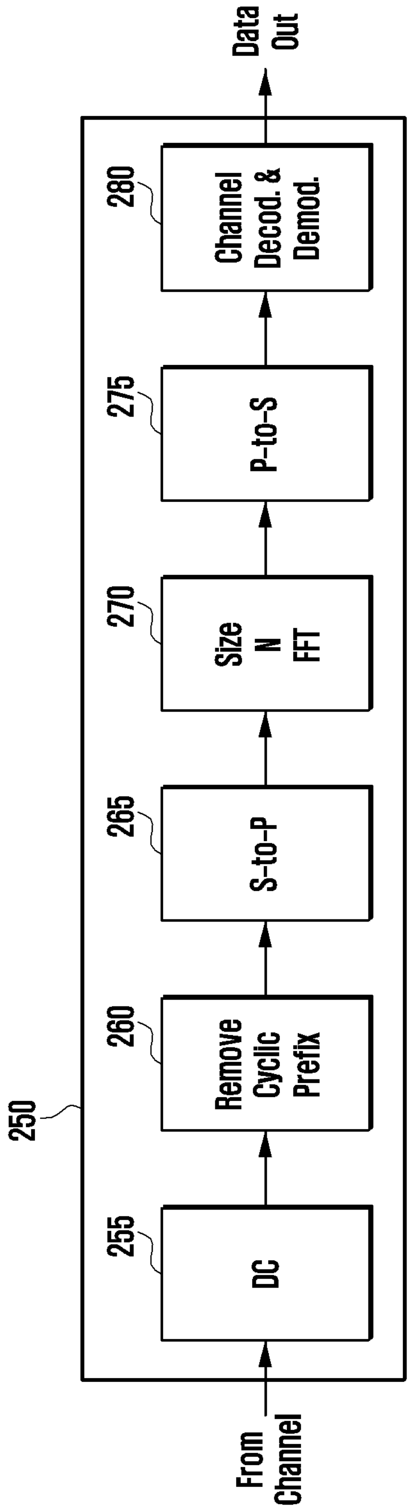
FIG. 2B illustrates a receive path according to an embodiment.

FIG. 2A illustrates a wireless transmit path according to an embodiment. FIG. 2B illustrates a wireless receive path according to an embodiment.

Referring to FIGS. 2A and 2B, a transmit path 200 can be implemented in a BS and a receive path 250 can be implemented in a UE. However, it should be understood that the receive path 250 can also be implemented in a BS and the transmit path 200 can be implemented in a UE. The receive path 250 may be configured to support codebook design and architecture for a system having a 2D antenna array.

The transmit path 200 includes a channel encoding and modulation block 205, a serial-to-parallel (S-to-P) block 210, a size N inverse fast Fourier transform (IFFT) block 215, a parallel-to-serial (P-to-S) block 220, an add cyclic prefix (CP) block 225, and an up-converter (UC) 230. The receive path 250 includes a down-converter (DC) 255, a remove CP block 260, an S-to-P block 265, a size N fast Fourier transform (FFT) block 270, a P-to-S block 275, and a channel decoding and demodulation block 280.

In the transmit path 200, the channel coding and modulation block 205 receives a set of information bits, applies coding (e.g., low density parity check (LDPC) coding), and modulates the input bits (e.g., using quadrature phase shift keying (QPSK) or QAM) to generate a sequence of frequency domain modulated symbols. The S-to-P block 210 converts (e.g., de-multiplexes) the serial modulated symbols to parallel data, generating N parallel symbol streams where N is the number of IFFT/FFT points used in the BS and the UE. The size N IFFT block 215 performs an IFFT operation on the N parallel symbol streams to generate time-domain output signals. The P-to-S block 220 converts (e.g., multiplexes) the parallel time-domain output symbols from the size N IFFT block 215, generating a serial time-domain signal. The add CP block 225 inserts a CP to the time domain signal. The up-converter 230 up-converts (e.g., modulates) the output of the add CP block 225 to a radio frequency (RF) frequency for transmission via a wireless channel. The signal may also be filtered at baseband before conversion to the RF frequency.

The RF signal transmitted from the BS arrives at the UE after passing through the radio channel, and reverse operations are then performed at the UE.

More specifically, the down-converter 255 down-converts the received RF signal to a baseband frequency, and the remove CP block 260 removes the CP in order to generate the serial time-domain baseband signal. The S-to-P block 265 converts the time-domain baseband signal to parallel time-domain signals. The size N FFT block 270 performs an FFT algorithm to generate N parallel frequency-domain signals. The P-to-S block 275 converts the parallel frequency domain signals to a sequence of modulated data symbols. The channel decoding and demodulation block 280 demodulates and then decodes the modulated symbols to recover the original input data stream.

Referring again to FIG. 1, for example, each of the BSs 101 and 103 may implement the transmit path 200 for transmitting in the downlink to the UEs 111 and 116 and may implement the receive path 250 for receiving in the uplink from the UE 111 and 116. Similarly, each one of the UEs 111 and 116 may implement the transmit path 200 for transmitting in the uplink to the BSs 101 and 103 and may implement the receive path 250 for receiving in the downlink from the BSs 101 and 103.

Each of the components in FIGS. 2A and 2B can be implemented using hardware, or using a combination of hardware and software/firmware. That is, at least some of the components in FIGS. 2A and/or 2B can be implemented with software, while other components can be implemented with configurable hardware or a mixture of software and configurable hardware. For example, the FFT block 270 and the IFFT block 215 can be implemented as configurable software algorithms in which the value of the number of points N can be modified according to the implementation.

Although FIGS. 2A and 2B respectively illustrate examples of the wireless transmit and receive paths, various changes can be made to these example. For example, the components in FIG. 2A and/or FIG. 2B can be combined, further subdivided, or omitted, and additional components can be added.

For example, although described as using the FFT block 270 and the IFFT block 215, the transmit path 200 and the receive path 250 are not limited to this example. For example, other types of transforms can be used, such as a discrete Fourier transform (DFT) and an inverse discrete Fourier transform (IDFT). For DFT and IDFT functions, the value of the variable N can be any integer (such as 1, 2, 3, 4, etc.), while for the FFT and IFFT functions, the value of the variable N can be any integer as a power of 2 (such as 1, 2, 4, 8, 16, etc.).

Further, although FIGS. 2A and 2B are intended to illustrate examples of the types of transmit and receive paths that can be used in a wireless network, any other suitable architecture can be used to support wireless communications in a wireless network.

Figure 3A:
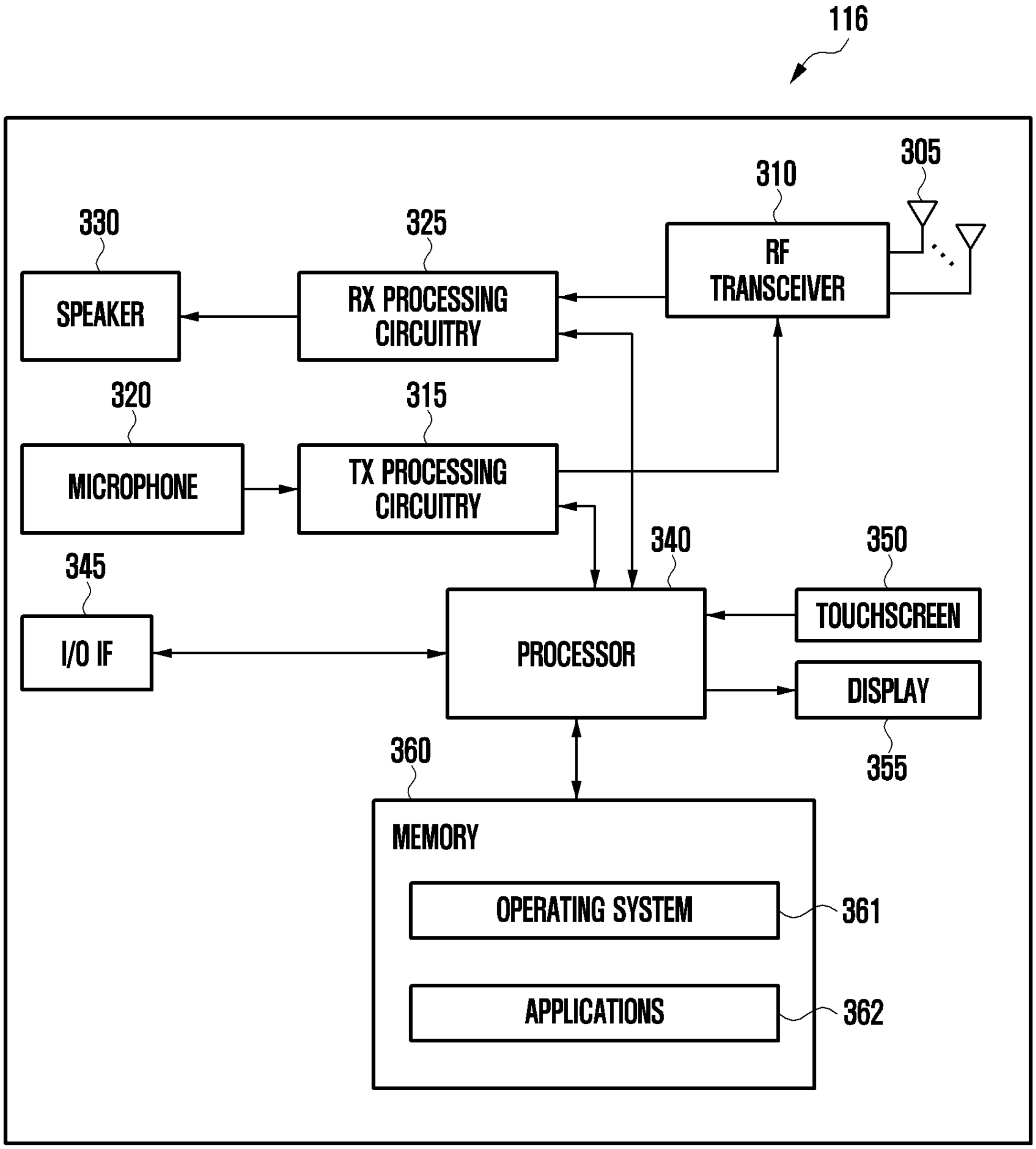
FIG. 3A illustrates a UE according to the embodiment.

FIG. 3A illustrates a UE according to an embodiment.

Referring to FIG. 3A, a UE 116 includes antennas 305, an RF transceiver 310, a transmit (TX) processing circuitry 315, a microphone 320, a receive (RX) processing circuitry 325, a speaker 330, a processor (or controller) 340, an input/output (I/O) interface 345, a touch screen (or other types of input devices) 350, a display 355, and a memory 360. The memory 360 includes an operating system (OS) 361 and one or more applications 362.

The RF transceiver 310 receives an incoming RF signal from antennas 305 transmitted by a BS of a wireless network. The RF transceiver 310 down-converts the incoming RF signal to generate an intermediate frequency (IF) or baseband signal. The RX processing circuitry 325 transmits a processed baseband signal to the speaker 330 (e.g., for received voice data) or to the processor 340 for further processing (e.g., for received web browsing data).

The TX processing circuitry 315 receives analog or digital voice data from the microphone 320, or other outgoing baseband data (such as web data, e-mail, or interactive video game data) from the processor 340. The TX processing circuitry 315 encodes, multiplexes, and/or digitizes the outgoing baseband data to generate a processed baseband or IF signal.

The RF transceiver 310 receives the outgoing processed baseband or IF signal from the TX processing circuitry 315, and up-converts the baseband or IF signal into an RF signal to be transmitted via the antennas 305.

The processor 340 may include one or more processors or other processing devices and executes the OS 361 stored in the memory 360 in order to control the overall operation of the UE 116. For example, using the executed OS 361, the processor 340 controls reception of forward channel signals and transmission of reverse channel signals via the RF transceiver 310, the RX processing circuitry 325, and the TX processing circuitry 315. The processor 340 may include at least one microprocessor or microcontroller.

The processor 340 may perform other processes and procedures resident in the memory 360, such as operations for channel quality measurement and reporting for systems having a 2D antenna array. The processor 340 may move data into or out of the memory 360 when an executing process.

The processor 340 may be configured to execute the application 362 based on the OS 361 or in response to signals received from the BS or an operator. The processor 340 is coupled to the I/O interface 345, which provides the UE 116 with the ability to connect to other devices, such as laptop computers and handheld computers. The I/O interface 345 is the communication path between these accessories and processor 340.

The processor 340 is also coupled to the touchscreen 350 and the display 355. The operator of the UE 116 can use the touchscreen 350 to enter data into the UE 116. Although FIG. 3 illustrates only the touchscreen 350 as an example of an input device, various other input devices, such a button or a keypad, may be included with or instead of the touchscreen 350 in the UE 116.

The display 355 may include a liquid crystal display (LCD) or other display capable of rending text and/or at least limited graphics (e.g., from websites).

The memory 360 is coupled to processor 340. The memory 360 may include random access memory (RAM), a flash memory, and/or read-only memory (ROM).

Additionally, various changes can be made to the UE 116 illustrated in FIG. 3A. That is, various components of FIG. 3A can be combined, further subdivided, or omitted, and additional components can be added. For example, the processor 340 can be divided into multiple processors, such as one or more central processing units (CPUs) and one or more graphics processing units (GPUs). Additionally, while FIG. 3A illustrates the UE 116 configured as a mobile phone or a smart phone, the UE 116 can be configured to operate as other types of mobile or stationary devices.

Figure 3B:
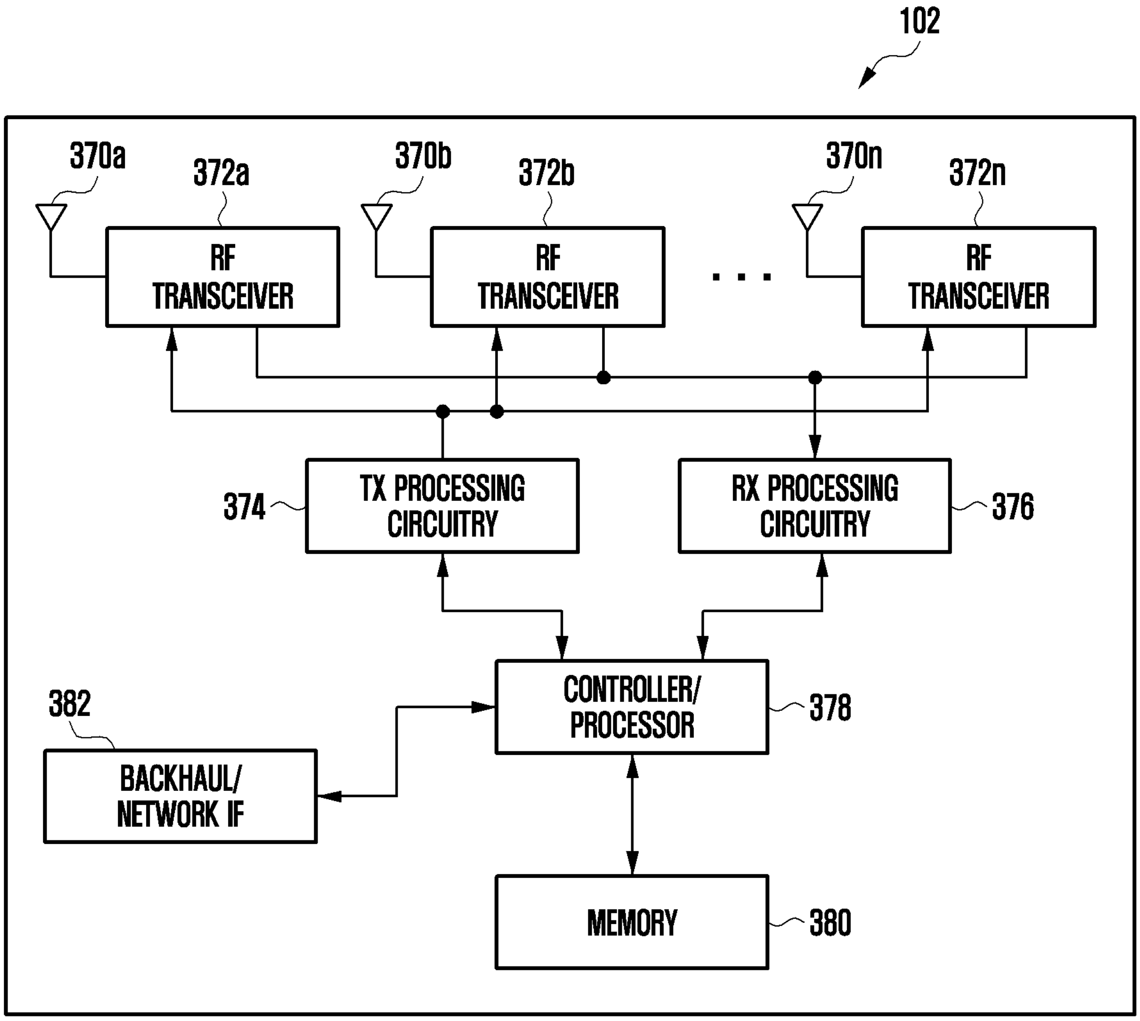
FIG. 3B illustrates a base station (BS) according to an embodiment.

FIG. 3B illustrates a BS according to an embodiment.

Referring to FIG. 3B, a BS 102 includes antennas 370*a*-370*n*, RF transceivers 372*a*-372*n*, TX processing circuitry 374, and RX processing circuitry 376. One or more of the antennas 370*a*-370*n* may include a 2D antenna array. The BS 102 also includes a controller 378, a memory 380, and a backhaul/network interface 382.

The RF transceivers 372*a*-372*n* receive incoming RF signals, such as signals transmitted by the UE or another BS, via the antennas 370*a*-370*n*, respectively. The RF transceivers 372*a*-372*n* down-convert the received RF signals in order to generate IF or baseband signals. The IF or baseband signals are transmitted to the RX processing circuitry 376, which generates a processed baseband signal by filtering, decoding, and/or digitizing the baseband or IF signals. The RX processing circuitry 376 transmits the processed baseband signals to the controller 378 for further processing.

The TX processing circuitry 374 receives analog or digital data (such as voice data, network data, email, or interactive video game data) from the controller 378. The TX processing circuitry 374 encodes, multiplexes, and/or digitizes the outgoing baseband data to generate processed baseband or IF signals. The RF transceiver 372*a*-372*n* receive the outgoing processed baseband or IF signals from the TX processing circuitry 374 and up-convert the baseband or IF signals into RF signals to be transmitted via the antennas 370*a*-370*n*, respectively.

The controller 378 may include one or more processors or other processing devices that control the overall operation of the BS 102. For example, the controller 378 controls the reception of forward channel signals and the transmission of backward channel signals via RF transceivers 372*a*-372*n*, RX processing circuitry 376, and the TX processing circuitry 374. The controller 378 may support additional functions such as more advanced wireless communication features. For example, the controller 378 may perform blind interference sensing (BIS) processes, such as those performed by BIS algorithms, and decoding the received signal from which the interference signal has been subtracted. The controller 378 may support any of a wide variety of other functions in the BS 102. The controller 378 may include at least one microprocessor or microcontroller.

The controller 378 may execute programs and other processes resident in the memory 380, such as a basic OS. The controller 378 may support channel quality measurement and reporting for systems having a 2D antenna array. The controller 378 may support communication between entities, e.g., web real-time communication (RTC). The controller 378 may move data into or out of memory 380 during an executing process.

The controller 378 is coupled to the backhaul/network interface 382, which allows the BS 102 to communicate with other devices or systems over a backhaul connection or over a network. The backhaul/network interface 382 may support communication over any suitable wired or wireless connections. For example, when the BS 102 is implemented as part of a cellular communication system (e.g., a cellular communication system supporting 5G or new radio (NR) access technologies, LTE, or LTE-A), the backhaul/network interface 382 can allow the BS 102 to communicate with other BSs over a wired or wireless backhaul connection. When the BS 102 is implemented as an AP, the backhaul/network interface 382 can allow the BS 102 to communicate with a larger network (such as the Internet) over a wired and/or wireless local area network or over a wired and/or wireless connection. The backhaul/network interface 382 includes any suitable structure supporting communications over a wired or wireless connection, such as an Ethernet or an RF transceiver.

The memory 380 is coupled to the controller 378. The memory 380 can include RAM, a flash memory, and/or ROM.

A plurality of instructions, such as a BIS algorithm, may be stored in the memory. The plurality of instructions may cause the controller 378 to perform the BIS process and decode the received signal after subtracting at least one interfering signal as determined by the BIS algorithm.

Transmit and receive paths of the BS 102 (implemented using the RF transceivers 372*a*-372*n*, the TX processing circuitry 374, and/or the RX processing circuitry 376) support communication with an aggregation of frequency division duplex (FDD) cells and TDD cells.

Additionally, various changes may be made to FIG. 3B. For example, the BS 102 may include any number of the components illustrated in FIG. 3B.

More specifically, an AP could include a number of backhaul/network interfaces 382, and the controller 378 could support routing functions to route data between different network addresses.

As another example, while FIG. 3B includes a single TX processing circuitry 374 and a single RX processing circuitry 376, the BS 102 could include multiple TX and/or RX processing circuitries (e.g., one for each RF transceiver).

In the 3$^{rd}$ generation partnership project (3GPP) 5G NR Rel-16 standard, research on non-terrestrial networks (NTNs) has been conducted. An NTN allows operators to provide commercial 5G services in areas where the terrestrial network infrastructure is not well developed, allowing for the continuity of 5G services, e.g., in emergency communication, maritime communication, aviation communication, and communication along railroads, which rely on satellite, wide-area coverage capacity.

In the Rel-17 standard, the NTN standard applied to Internet of things (IoT) is now being studied, and similar to the NR NTN system, an IoT NTN system needs technical enhancement for uplink and downlink synchronization. In addition, it is also necessary for the IoT NTN system to consider the transmission scenario of a half-duplex UE.

More specifically, a half-duplex transmission method may lead to new problems, e.g., when a UE switches from a long time uplink transmission to downlink monitoring, it may have lost downlink synchronization and must acquire a new downlink synchronization quickly. In addition, low cost and low power requirements, which are very important to IoT UEs, should also be considered as optimization goals when supporting NTNs.

In a NTN, there are two scenarios based on whether the satellite has the capacity to decode 5G signals: 1) a transparent payload-based scenario; and 2) a regenerative payload-based scenario.

In the transparent payload-based scenario, a satellite does not have the capacity to decode the 5G signal, and the satellite transmits the received 5G signal from the ground terminal directly to the NTN gateway on the ground.

In the regenerative payload-based scenario, the satellite has the capacity to decode 5G signals, and the satellite decodes the 5G signals received from the ground terminal, and then re-encodes the decoded data and transmits it either directly to the NTN gateway on the ground or to other satellites, which is then relayed to the NTN gateway on the ground by other satellites.

The extremely high altitude of satellites from the ground (e.g., 600 km or 1200 km for low-orbiting satellites and nearly 36,000 km for synchronous satellites) makes the transmission delay of communication signals between ground terminals and satellites extremely high, even tens or hundreds of milliseconds, compared to tens of microseconds in conventional terrestrial cellular networks, and this huge difference makes that it is necessary for the NTNs to use different physical layer designs from terrestrial networks (TNs), and uplink and downlink time and frequency synchronization/tracking, timing advance (TA) for uplink transmissions, physical layer processes, and delay-sensitive hybrid automatic repeat request (HARQ) retransmissions, etc., may require new designs.

An effect of the very large transmission distance (time delay) is to increase the TA of the UE, which makes the existing physical random access channel (PRACH) pilot frequency sequence for estimating the maximum 2 ms TA in the NR system not reusable due to the TA approximation of twice the transmission delay. Additionally, in order to avoid introducing new PRACH pilot frequency sequence, the UE can estimate the TA autonomously, e.g., the UE calculates the distance between the satellite and the UE based on the satellite ephemeris to estimate the TA, or estimates the TA according to the time difference between the received timestamp and the local reference time, and the UE can use the estimated TA for transmitting the PRACH based on the estimated TA, and the residual TA caused by the estimation error can be estimated by the base station.

Another effect of the very large transmission distance (latency) is to extend the frequency offset of the radio signal to improve the performance of the uplink frequency synchronization, such the UE can pre-compensate a portion of the uplink frequency offset for the uplink transmission and the residual uplink frequency offset can be corrected by the base station. Correspondingly, in the downlink, the base station may pre-compensate a portion of the downlink frequency offset for the downlink transmission, and the residual downlink frequency offset is corrected by the UE.

In addition, due to the high speed relative motion between the UE and the satellite, both uplink and downlink timing and Doppler frequency drift, and these make the uplink and downlink synchronization in NTN require new technology enhancements.

Figure 4:
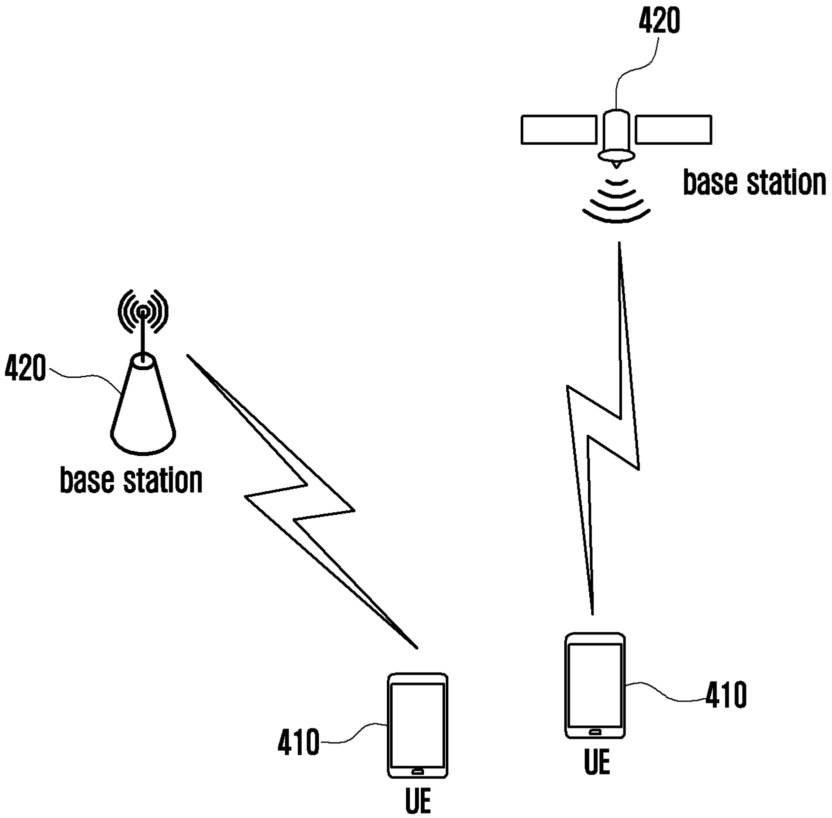
FIG. 4 illustrates a network architecture according to an embodiment.

FIG. 4 illustrates a network architecture according to an embodiment.

Referring to FIG. 4, the network architecture includes UEs 410 and BSs 420. The BSs 420 may be a satellite, a space platform, a terrestrial BS, etc. The BSs 420 may be deployed in an NTN. The UEs 410 and the BSs 420 can communicate with each other via some airport technology.

Figure 5:
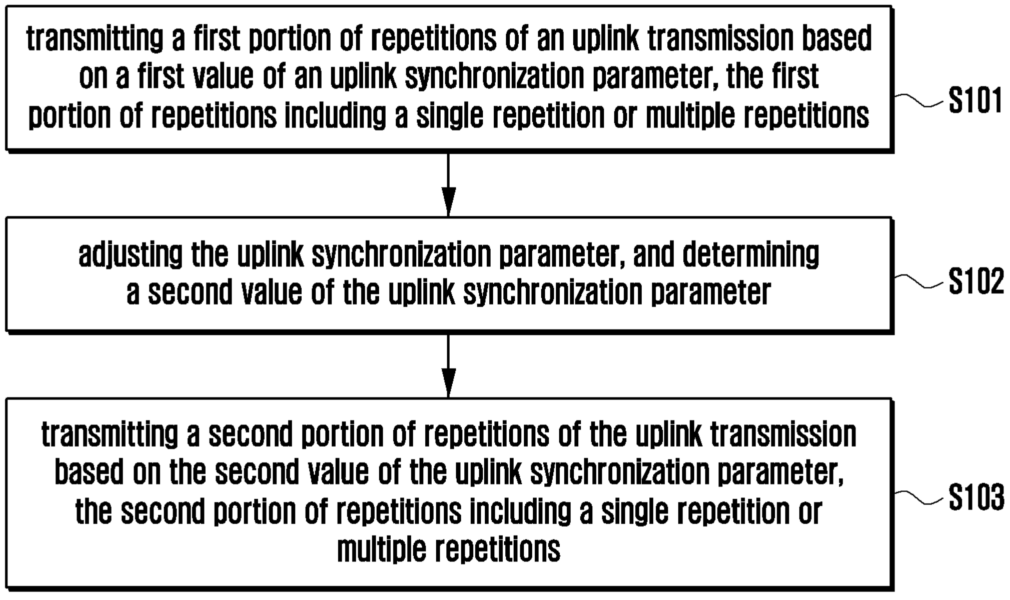
FIG. 5 is a flowchart illustrating a synchronization method according to an embodiment.

Adjustment of TA and Pre-Compensated Uplink Frequency Offset During Repetition Transmission of the Uplink FIG. 5 is a flowchart illustrating a synchronization method according to an embodiment. Specifically, FIG. 5 illustrates a synchronization method performed by a UE.

Referring to FIG. 5, in step S101, the UE transmits a first portion of repetitions of an uplink transmission based on a first value of an uplink synchronization parameter. The first portion of repetitions may include a single repetition or multiple repetitions.

In step S102, the UE adjusts the uplink synchronization parameter, and determines a second value of the uplink synchronization parameter.

In step S103, the UE transmits a second portion of repetitions of the uplink transmission based on the second value of the uplink synchronization parameter. The second portion of repetitions may include a single repetition or multiple repetitions.

In an accordance with an embodiment, the uplink synchronization parameter includes at least one of a TA or a pre-compensated uplink frequency offset.

Based on the foregoing, the UE may adjust the uplink synchronization parameter during the transmission of an uplink transmission, determine the second value of the uplink synchronization parameter, transmit the second portion of repetitions of the uplink transmission based on the second value of the uplink synchronization parameter, and thus, maintain the uplink synchronization during the uplink transmission.

Coverage enhancement is also an important design goal for IoT systems. For example, narrow band (NB)-IoT requires a 20 dB enhancement over global system for mobile communications (GSM), i.e., a maximum coupling loss (MCL) of 164 dB, and an enhanced machine-type communication (eMTC) requires a 15 dB enhancement over FDD LTE, i.e., an MCL of 155.7 dB. To achieve such a high coverage enhancement, the physical channel may accumulate power by repetition transmission in time to enhance coverage.

Figure 6:
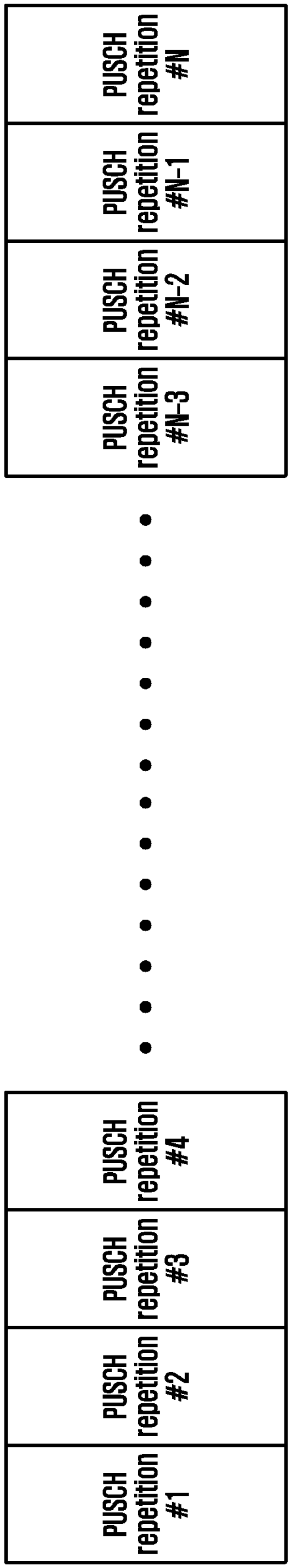
FIG. 6 illustrates a synchronization operation according to an embodiment.

FIG. 6 illustrates a synchronization operation according to an embodiment.

Referring to FIG. 6, a physical uplink shared channel (PUSCH) is re-transmitted N times to enhance the coverage.

In an eMTC system, the maximum number of PUSCH repetitions is 2048, so one uplink and downlink transmission in the IoT system may last for a long time, even up to several seconds, and in such a long and continuous transmission, the uplink and downlink synchronization may change, including time synchronization and frequency synchronization, and for an NTN network based on the IOT system, this synchronization change will be more serious due to the relative high speed movement between UE and satellite. Accordingly, the UE should adjust the uplink synchronization parameters during a transmission process of an uplink transmission, and the downlink synchronization parameters during the reception process of a downlink transmission.

In an uplink transmission, the UE should transmit the uplink signal relative to the downlink subframe by a certain amount of time, i.e., a TA, in order to make all UEs in the cell have the same signal arrival time at the BS side as well as to compensate the transmission delay between the BS and the UE, so that the uplink and downlink subframes at the BS side are aligned in time.

Further, in order to make the synchronization of the uplink frequency at the BS side easier, the UE should compensate the uplink frequency offset in advance when transmitting the uplink signal. If the duration of an uplink transmission is long, the TA and/or the pre-compensated uplink frequency offset can change, i.e., the TA and/or the pre-compensated uplink frequency offset used for the previous repetition of the same uplink transmission may not be applicable for the later repetition.

Embodiment 1

The UE can adjust the TA, and/or pre-compensated uplink frequency offset during the transmission of an uplink transmission, i.e., the UE can use different TAs, and/or different pre-compensated uplink frequency offsets for different repetitions of the same uplink transmission, which can be a PUSCH or physical uplink control channel (PUCCH) in eMTC systems, and a narrow PUSCH (NPUSCH) in NB-IoT systems.

A process according to Embodiment 1 may include:

Step 1: The UE transmits a first portion of repetitions of the uplink transmission having multiple repetitions with the first value of the uplink synchronization parameter. The uplink synchronization parameter may include at least one of a TA or a pre-compensated uplink frequency offset. A first value of TA may be referred to as a first TA, a first value of the pre-compensated uplink frequency offset may be referred to as a pre-compensated first frequency offset, and a first portion of repetitions may contain only one repetition, or contain multiple repetitions.

Step 2: The UE adjusts the uplink synchronization parameter and determines the second value of the adjusted uplink synchronization parameter. The second value of the TA may be referred to as the second TA and the second value of the pre-compensated uplink frequency offset may be referred to as the pre-compensated second frequency offset.

Step 3: The UE transmits a second portion of repetitions of the uplink transmission using the second value of the uplink synchronization parameter. The second portion of repetitions may include one repetition, or multiple repetitions. The second portion of repetitions follows the first portion of repetitions.

While transmitting a first portion of repetitions of an uplink transmission, or transmitting a second portion of repetitions of an uplink transmission, when the tail of the first portion of repetitions overlaps the head of the second portion of repetitions, the overlapped part of the tail of the first portion of repetitions or the overlapped part of the head of the second portion of repetitions may be dropped.

Figure 7:
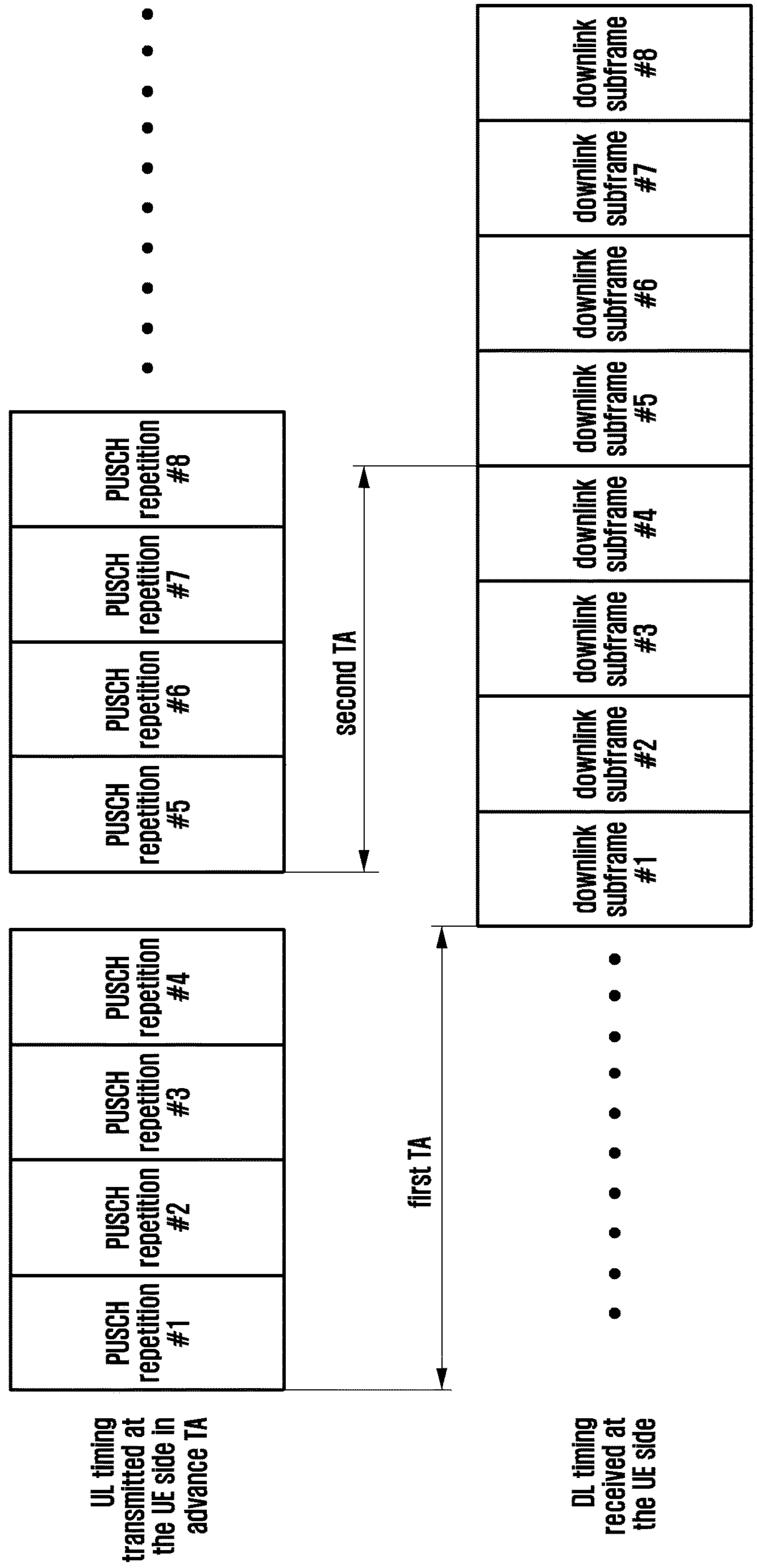
FIG. 7 illustrates a synchronization operation according to an embodiment.
Figure 8:
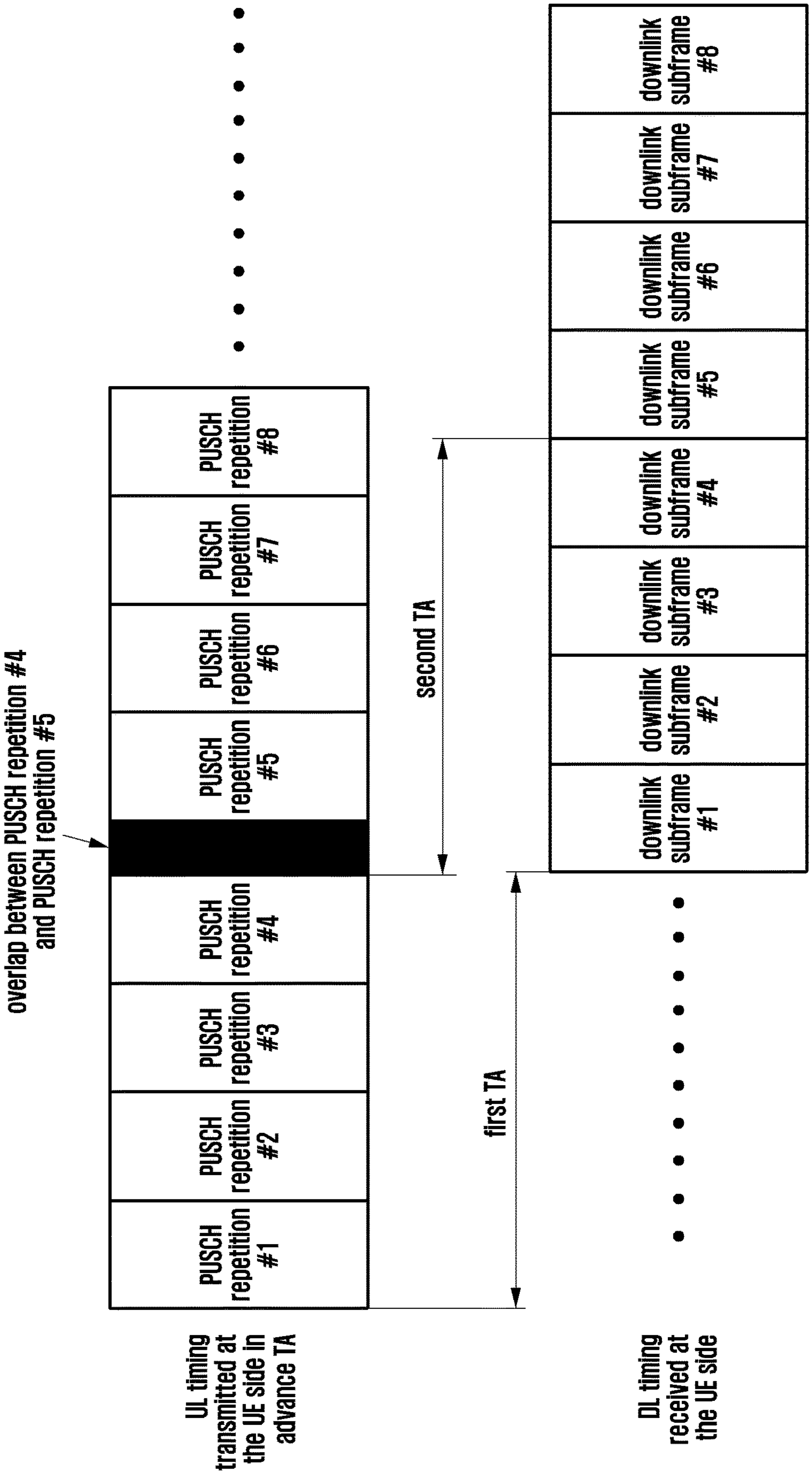
FIG. 8 illustrates a synchronization operation according to an embodiment.

FIGS. 7 and 8 illustrate synchronization operations according to embodiments.

Referring to FIGS. 7 and 8, the UE applies the first TA to transmit repetitions #1~#4 of a PUSCH transmission, and applies the second TA to transmit repetitions #5~#8 of this PUSCH transmission. The first TA and the second TA are different values. If the second TA is smaller than the first TA, there will be a gap between PUSCH repetition #4 and repetition #5, as illustrated in FIG. 7, and the size of the gap is a different value between the first TA and the second TA. If the second TA is greater than the first TA, then the tail of PUSCH repetition #4 overlaps with the head of repetition #5, as illustrated in FIG. 8. The UE can drop the overlapped part of the tail of the previous repetition (PUSCH repetition #4) or the overlapped part of the head of the latter repetition (PUSCH repetition #5) according to predefined guidelines.

In order to avoid the overlap of the two preceding and following uplink repetitions caused by TA adjustment, the BS, when allocating uplink transmission resources, may have a gap between the two preceding and following repetitions at the time of TA adjustment, i.e., the UE has no uplink transmission at this gap and does not necessarily monitor a physical downlink control channel (PDCCH), then TA adjustment will not cause the problem of the overlap of the two preceding and following uplink repetitions. The gap may include one or more orthogonal frequency division multiplexing (OFDM) symbols, or include one or more subframes.

In a process of transmitting a first portion of repetitions of an uplink transmission, or transmitting a second portion of repetitions of an uplink transmission, a gap is presented per M repetitions, where M is a positive integer, and the UE has no uplink transmissions and does not necessarily monitor the PDCCH during the gap. The UE adjusts the uplink synchronization parameter during the gap, a length of the gap is predefined, or preconfigured by the BS.

In Embodiment 1, the UE's uplink transmission has one gap every M subframes or repetitions. The gap contains one or more symbols or subframes. The UE has no uplink transmissions during this gap, and does not necessarily monitor the PDCCH. Although this gap is used to avoid transmission overlap caused by the TA adjustment, it can also be used for the UE to 1) autonomously estimate the TA and/or the pre-compensated uplink frequency offset during this gap time, 2) to update the TA and/or the pre-compensated uplink frequency offset during this gap time, or 3) to update the TA and/or the pre-compensated uplink frequency offset during this gap time. Here, the size of the M may be predefined or preconfigured by the BS.

Figure 9:
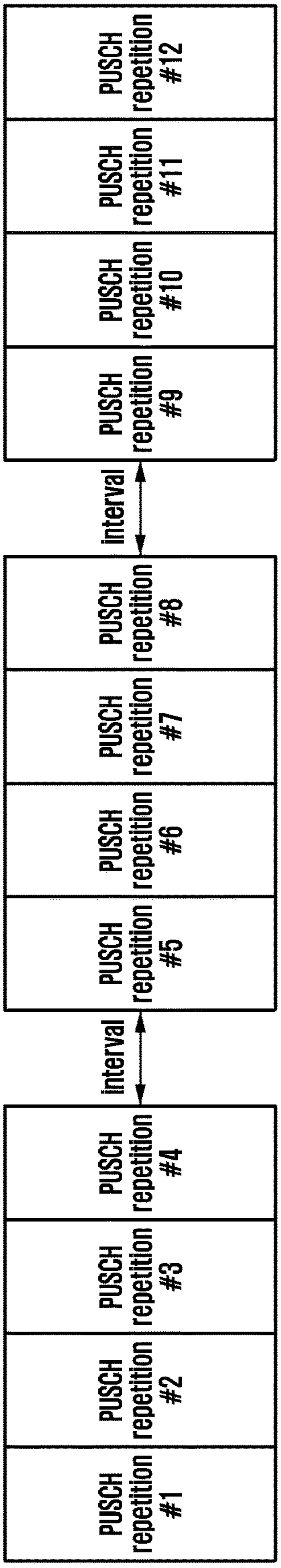
FIG. 9 illustrates a synchronization operation according to an embodiment.

FIG. 9 illustrates a synchronization operation according to an embodiment.

Referring to FIG. 9, M=4, i.e., there is a gap per four PUSCH repetitions.

The uplink synchronization parameter may be adjusted when at least one of the following conditions is met:

- the UE has a capacity to adjust the uplink synchronization parameter during the transmission of the uplink transmission;
- the BS configures the UE to adjust the uplink synchronization parameter during the transmission of the uplink transmission; or
- the number of repetitions of the uplink transmission is greater than a first threshold value.

In accordance with Embodiment 1, the capacity of the UE to adjust the TA, and/or the pre-compensated uplink frequency offset during an uplink transmission is related to whether the UE has the corresponding capacity, i.e., some UEs have this capacity and some do not, and the UE can report whether it has this capacity to the BS.

In accordance with Embodiment 1, whether the UE can adjust the TA, and/or the pre-compensated uplink frequency offset during an uplink transmission is related to the configuration of the BS, i.e., the BS can configure whether the UE can adjust the TA, and/or the pre-compensated uplink frequency offset during an uplink transmission, which can be configured by the BS via system information, i.e., the configuration applies to all UEs in the cell, or is configured via UE-specific RRC signaling, i.e., the configuration only applies to this UE.

In accordance with Embodiment 1, the capacity of the UE to adjust the TA, and/or the pre-compensated uplink frequency offset during an uplink transmission is related to the number of repetitions of the uplink transmission, and the UE may adjust the TA, and/or the pre-compensated uplink frequency offset during the transmission of the uplink transmission only if the number of repetitions of the uplink transmission is greater than a threshold value. The threshold value may be predefined or preconfigured by the BS. If the number of repetitions of the uplink transmission is less than the threshold value, the UE cannot adjust the TA, and/or the pre-compensated uplink frequency offset during the transmission of the uplink transmission, i.e., the same TA, and/or pre-compensated uplink frequency offset is used for all repetitions of the uplink transmission.

Adjusting the uplink synchronization parameter may include at least one of the following items:

- adjusting the TA according to a drift rate of the TA, which is preconfigured by the BS or estimated by the UE;
- adjusting the pre-compensated uplink frequency offset according to a drift rate of a Doppler frequency, which is preconfigured by the BS, or estimated by the UE; and
- adjusting the TA according to a TA adjustment command transmitted by the BS.

The pre-compensated uplink frequency offset may be adjusted according to the uplink frequency offset adjustment command transmitted by the BS.

In accordance with Embodiment 1, the UE may adjust the TA during the transmission of an uplink transmission based on the TA drift rate, which is the amount of change of the TA per unit time, and the TA drift rate may be estimated by the UE itself, or preconfigured by the BS, and the UE may calculate the TA adjustment amount based on the TA drift rate, and the time duration since the last TA adjustment. The UE can adjust the TA periodically. The adjustment period can be preconfigured by the BS or decided by the UE based on the TA drift rate, e.g., the UE will adjust the TA whenever the TA change exceeds a preset value.

In accordance with Embodiment 1, the UE can adjust the pre-compensated uplink frequency offset during the transmission based on the drift rate of the Doppler Frequency, which is the amount of change in frequency offset per unit time, during the transmission of an uplink transmission. The drift rate of Doppler frequency is the change in frequency offset per unit time. The drift rate of Doppler frequency can be estimated by the UE itself or preconfigured by the BS. The UE can calculate the adjustment of frequency offset based on the drift rate of the Doppler frequency and the length of time since the last adjustment of frequency offset. The UE can adjust the frequency offset periodically. The adjustment period can be preconfigured by the BS or determined by the UE based on the Doppler Drift rate, e.g., the UE adjusts the frequency offset whenever the change in the frequency offset exceeds a preset value.

In accordance with Embodiment 1, the UE may adjust the TA, and/or the pre-compensated uplink frequency offset during the transmission of an uplink transmission based on the indication from the BS, e.g., the UE may adjust the TA based on TA control command indicated by the BS via a medium access control (MAC) control element (CE). The UE may adjust the pre-compensated uplink frequency offset based on the uplink frequency offset control command indicated by the BS via the MAC CE, considering that the activation time of the MAC CE command may be just during the transmission of the UE's uplink transmission, then the UE may apply the newly adjusted TA and/or the pre-compensated uplink frequency offset only for repetitions of the uplink transmission after this activation time.

In accordance with Embodiment 1, the UE may adjust the TA, and/or the pre-compensated uplink frequency offset during the transmission of an uplink transmission based on autonomous estimation. The UE may estimate the TA and frequency offset based on information such as global navigation satellite system (GNSS) positioning information and the satellite ephemeris indicated by the BS. For example, the UE may estimate the transmission delay between the UE and the satellite based on its own geographic position and the geographic position of the satellite, and thus, the UE can also estimate the uplink frequency offset based on the relative movement speed of the satellite to itself.

Adjusting the uplink synchronization parameter may include adjusting the TA per M repetitions periodically during the transmission of the uplink transmission, and/or adjusting the pre-compensated uplink frequency offset per N repetitions periodically.

M may be predefined, preconfigured by the BS, or determined based on the TA drift rate. N may be predefined, preconfigured by the BS, or determined based on the uplink Doppler frequency drift rate. M and N are positive integers.

In accordance with Embodiment 1, the UE periodically adjusts the TA every M subframes or repetitions during the transmission of an uplink transmission, and/or periodically adjusts the pre-compensated uplink frequency offset every N subframes or repetitions, i.e., the uplink transmissions within M subframes or repetitions have the same TA, and the uplink transmissions within N subframes or repetitions have the same pre-compensated frequency offset. M and N can be the same value or can be different values, i.e., the UE can adjust the TA as well as the pre-compensated uplink frequency offset separately at different repetitions.

M is greater than or equal to a third value, and N is greater than or equal to a fourth value, wherein the third value and the fourth value are predefined, preconfigured by the BS, or determined based on the UE capacity.

The sizes of M and N are determined by the UE itself. For example, the UE may decide the size of M based on the TA drift rate, and the UE may decide the size of N based on the Doppler drift rate.

The sizes of M and N may be determined by the UE itself, and the BS and the UE have a common understanding of the sizes of M and N, i.e., the sizes of M and N are known to the BS. For example, the UE calculates the size of N according to a predefined formula based on the TA drift rate, and if the TA drift rate is preconfigured by the BS, then the size of N is known to the UE by the BS. If the TA Drift rate is estimated autonomously by the UE, then the UE should report the TA drift rate, and/or the size of N to the BS.

At least one of M and N satisfies the minimum value requirement, the minimum value is predefined, or preconfigured by the BS. The size of M and N is determined by the UE itself, but must meet the minimum value requirement specified by the system, where the system-specified minimum value of MIN is predefined or preconfigured by the BS.

The size of M and N may be preconfigured by the BS, but only if the minimum value of the UE capacity is met, and the UE reports to the BS the minimum value of M and N that can be achieved, and the size of the M and N configured by the BS should be greater than or equal to the minimum value reported by the UE.

Based on the adjustment of the TA and the pre-compensated uplink frequency offset during the uplink repetition transmission by the UE as described above, the maintenance of uplink synchronization during a long uplink transmission by UE may be achieved.

Figure 10:
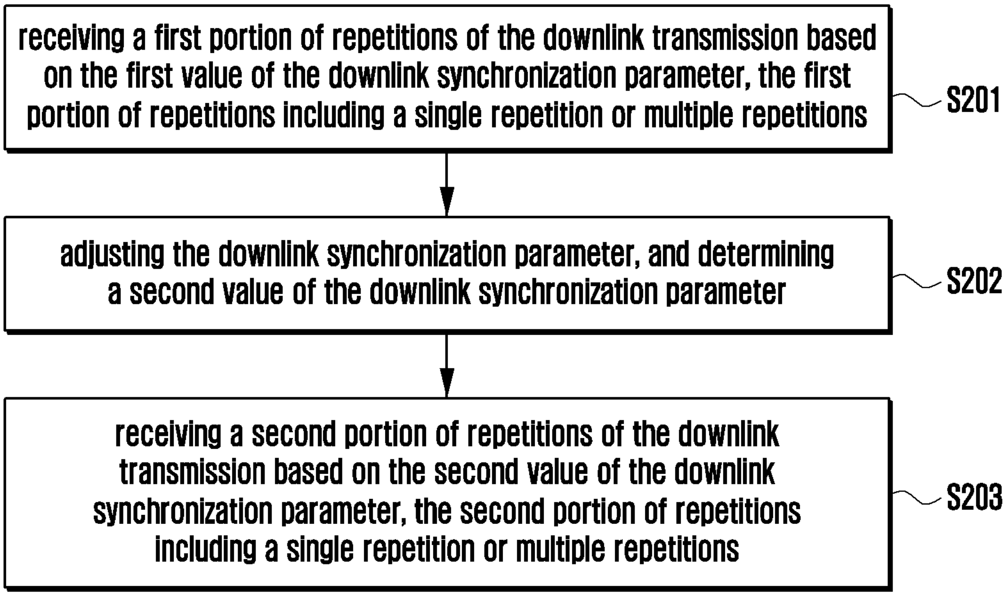
FIG. 10 is a flowchart illustrating a synchronization method according to an embodiment.

Maintenance of Downlink Synchronization During the Downlink Repetition Transmission FIG. 10 is a flowchart illustrating a synchronization method according to an embodiment. Specifically, FIG. 10 illustrates a synchronization method performed by a UE.

Referring to FIG. 10, in step S201, the UE receives a first portion of repetitions of the downlink transmission based on the first value of the downlink synchronization parameter. The first portion of repetitions may include a single repetition or multiple repetitions.

In step S202, the UE adjusts the downlink synchronization parameter, and determines a second value of the downlink synchronization parameter.

In step S203, the UE receives a second portion of repetitions of the downlink transmission based on the second value of the downlink synchronization parameter. The second portion of repetitions may include a single repetition or multiple repetitions.

The downlink synchronization parameter may include at least one of a downlink timing or a compensated downlink frequency offset.

Based on the foregoing, the UE may adjust the downlink synchronization parameter during the transmission of a downlink transmission, determine the second value of the downlink synchronization parameter, and transmit the second portion of repetitions of the downlink transmission based on the second value of the downlink synchronization parameter, thus, maintaining the downlink synchronization during the downlink transmission.

It Similar to the uplink transmission, if a downlink transmission has a long duration (i.e., a large number of repetitions), the downlink synchronization may change during the reception of the downlink transmission, which may lead to downlink desynchronization. Therefore, the UE should adjust the synchronization parameters, including the time synchronization parameters and/or the frequency synchronization parameters, during the reception of a downlink transmission. For example, the UE should adjust the downlink timing and/or the compensated downlink frequency offset (i.e., for frequency correction of the received signal) of the signal reception (i.e., for determining the subframe start position of the received signal so as to further determine the OFDM symbol boundary) during the reception of a downlink transmission. The downlink timing is the boundary position of the downlink receive subframe.

Embodiment 2

The UE may adjust the downlink synchronization parameter during reception of a downlink transmission, such as adjusting the downlink timing, and/or the compensated downlink frequency offset, i.e., the UE may apply different downlink timing, and/or different compensated downlink frequency offset for different repetitions of the same downlink transmission, wherein in the eMTC systems. The downlink transmission can be a physical downlink shared channel (PDSCH) or a physical downlink control channel (PDCCH). In NB-IoT systems, the downlink transmission can be a narrow PDSCH (NPDSCH) or a narrow PDCCH (NPDCCH).

A process in accordance with Embodiment 2 may include:

Step 1: The UE receives a first portion of repetitions of a downlink transmission by using a first value of the downlink synchronization parameter, the downlink transmission having multiple repetitions. The downlink synchronization parameter includes at least one of a downlink timing or a compensated downlink frequency offset. The first value of the downlink timing may be referred to as a first downlink timing, the first value of the compensated downlink frequency offset may be referred to as the compensated first frequency offset, and the first portion of repetitions may include one repetition or include multiple repetitions.

Step 2: The UE adjusts the downlink synchronization parameters and determines the second value of the adjusted downlink synchronization parameter. The second value of the downlink timing may be referred to as the second downlink timing, and the second value of the compensated downlink frequency offset may be referred to as the compensated second frequency offset.

Step 3: The UE receives the second portion of repetitions of the downlink transmission by using the second value of the second downlink synchronization parameter. The second portion of repetitions may include one repetition or multiple repetitions. The second portion of repetitions follows the first portion of repetitions.

Figure 11:
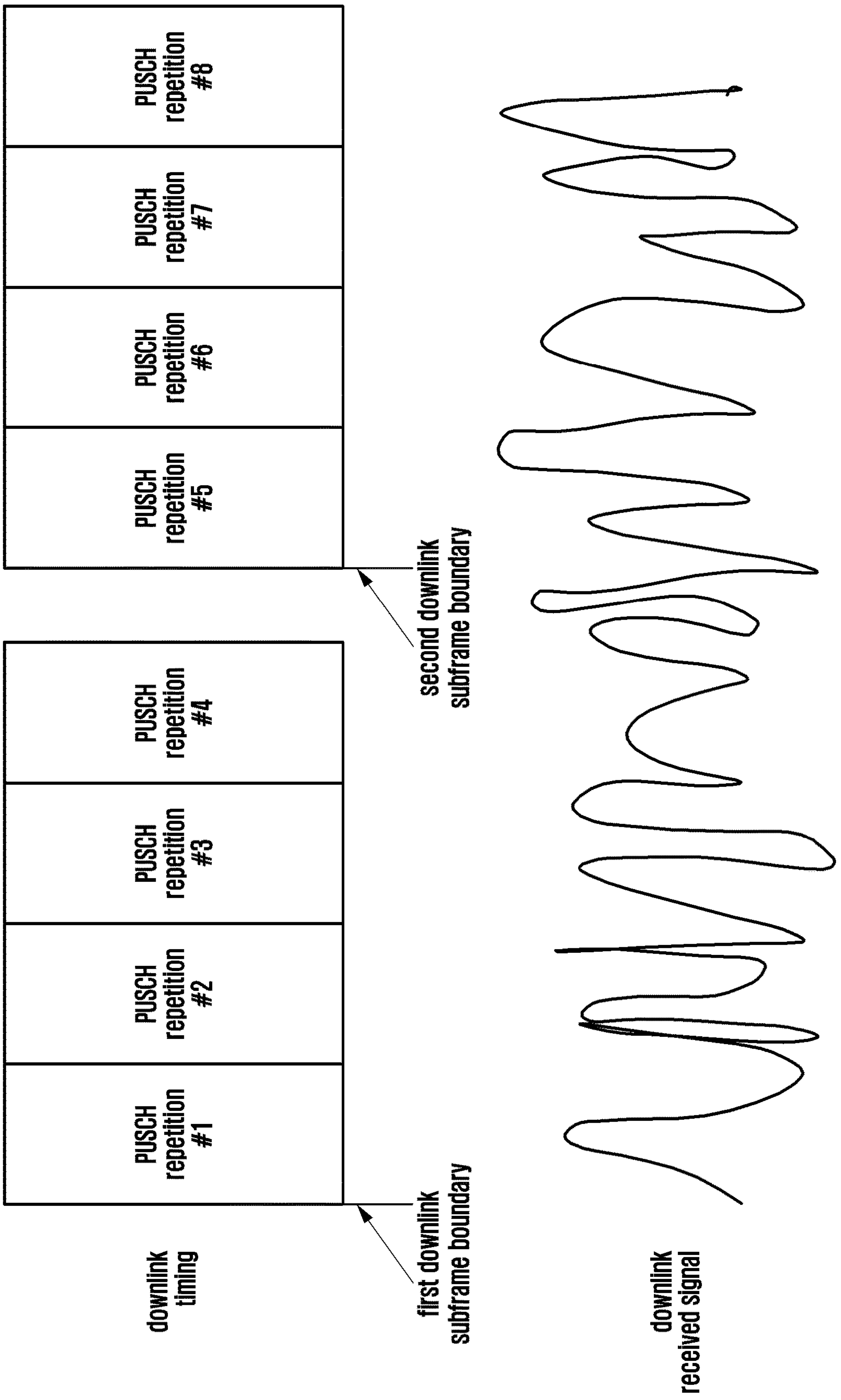
FIG. 11 illustrates a synchronization operation according to an embodiment.
Figure 12:
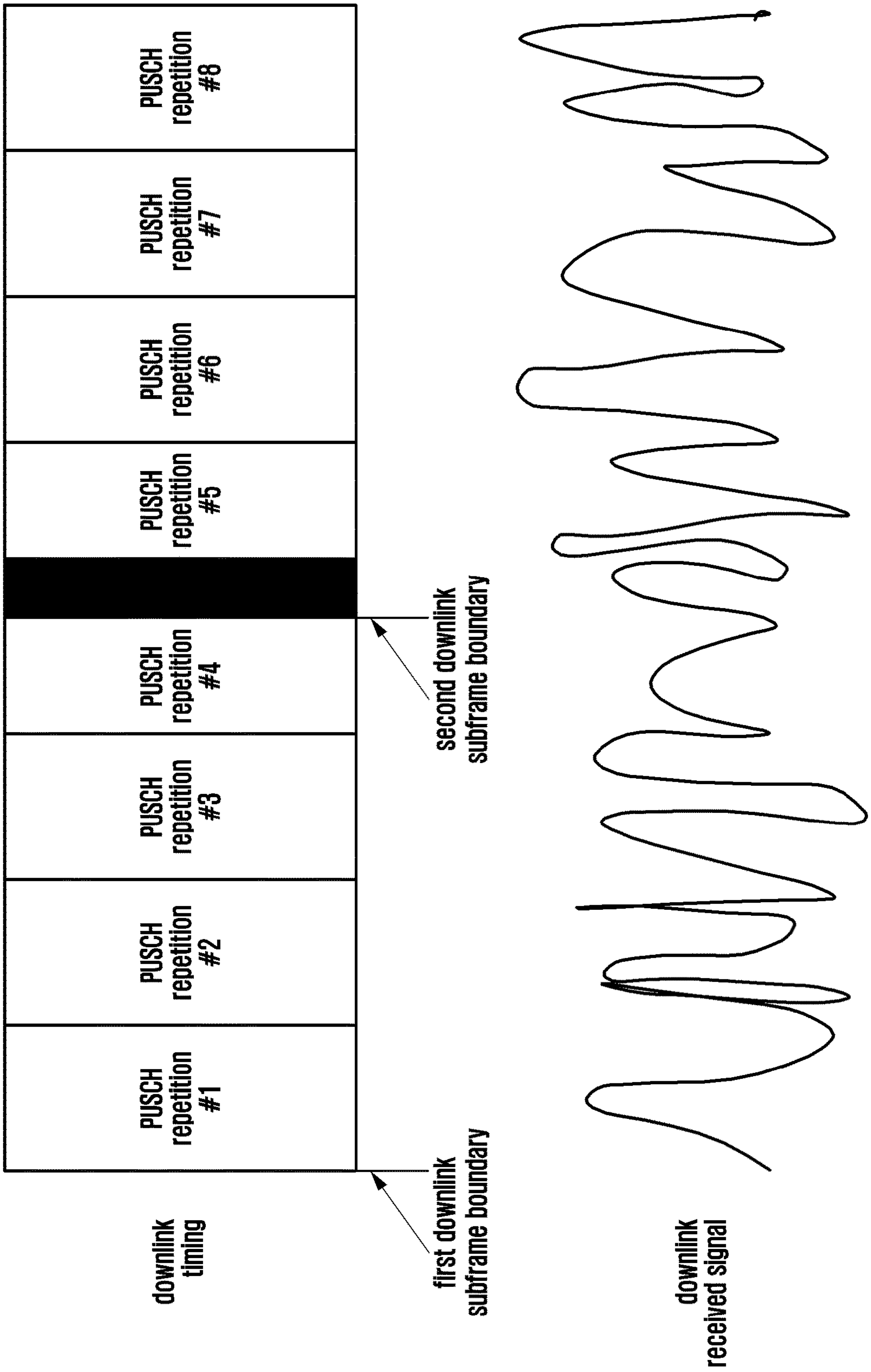
FIG. 12 illustrates a synchronization operation according to an embodiment.

FIGS. 11 and 12 illustrate synchronization operations according to embodiments.

Referring to FIGS. 11 and 12, the UE applies the first downlink timing to receive repetitions #1 to #4 of a PDSCH transmission and applies the second downlink timing to receive repetitions #5 to #8 of this PDSCH transmission. The UE further determines an OFDM symbol boundary based on the downlink timing, thereby converting the time domain signal to frequency domain processing. If the first downlink timing and the second downlink timing have different downlink timings, an effect of applying different downlink timings is to introduce a gap between PDSCH repetition #4 and PDSCH repetition #5, as illustrated in FIG. 11, i.e., PDSCH repetition #4 is not consecutive with PDSCH repetition #5. Another effect of applying different downlink timings is that the tail of PDSCH repetition #4 and the head of PDSCH repetition #5 will overlap, as illustrated in FIG. 12, and the UE can either drop the overlapping prat of the tail of the previous repetition (PUSCH repetition #4) or drop the overlapping prat of the head of the next repetition (PUSCH repetition #5) according to predefined guidelines.

The downlink synchronization parameter may be adjusted when at least one of the following conditions is met:

the UE has a capacity of adjusting the downlink synchronization parameter during the reception of the downlink transmission;

the BS configures the UE to adjust the downlink synchronization parameter during the reception of downlink transmissions; or the number of repetitions of the downlink transmission is greater than a second threshold value.

In accordance with Embodiment 2, the capacity of the UE to adjust the downlink timing, and/or the compensated downlink frequency offset during a downlink transmission may be related to whether the UE has the corresponding capacity, i.e., some UEs have this capacity and some do not. The UE can report to the BS whether it has this capacity.

In accordance with Embodiment 2, whether the UE can adjust the downlink timing, and/or the compensated downlink frequency offset during a downlink transmission may be related to the configuration of the BS, i.e. the BS can configure whether the UE can adjust the downlink timing, and/or the compensated downlink frequency offset during a downlink transmission. The BS can configure through system information, i.e., the configuration applies to all UEs in the cell, or configure through UE-specific RRC signaling, i.e., the configuration applies only to this UE.

In accordance with Embodiment 2, the capacity of the UE to adjust the downlink timing, and/or the compensated downlink frequency offset during a downlink transmission may be related to the number of repetitions of the downlink transmission, and the UE can only adjust the downlink synchronization parameters, such as the downlink timing of the signal reception, and/or the compensated downlink frequency offset, during the downlink transmission only if the number of repetitions of the downlink transmission is greater than a threshold value, the threshold value may be predefined or preconfigured by the BS. If the number of repetitions of the downlink transmission is less than the threshold value, the UE does not necessarily adjust the downlink synchronization parameters during the reception of the downlink transmission, i.e., the same downlink synchronization parameters are used for all repetitions of the downlink transmission.

Adjusting the downlink synchronization parameter includes at least one of the following items:

adjusting the downlink timing according to the drift rate of the downlink timing, which is preconfigured by the BS, estimated by the UE, or equal to the TA drift rate.

adjusting the compensated downlink frequency offset according to the drift rate of the Doppler frequency, which is preconfigured by the BS, estimated by the UE, or equal to the drift rate of the uplink Doppler frequency.

In accordance with Embodiment 2, the UE may adjust the downlink timing of the downlink signal reception during the reception of a downlink transmission based on the drift rate of the downlink timing, where the drift rate of the downlink timing is the amount of change in the downlink timing per unit time. Here, the downlink timing drift rate can be estimated by the UE itself, preconfigured by the BS, or equal to the TA drift rate.

In accordance with Embodiment 2, the UE can adjust the frequency offset correction amount for downlink signal reception during reception process of a downlink transmission based on the drift rate of the downlink Doppler frequency, where the drift rate of the downlink Doppler frequency is the amount of change of the downlink frequency per unit time, either estimated by the UE itself, preconfigured by the BS, or equal to the Drift rate of the uplink Doppler frequency. A resynchronization reference signal (RRS) is transmitted during repetition and has a gap for receiving a primary synchronization signal (PSS)/secondary synchronization signal (SSS).

During the reception process of a downlink transmission over a long duration, downlink desynchronization may occur, and in order to regain the downlink synchronization, the UE should receive a dense segment of an RRS and/or a PSS/SSS to obtain the latest downlink synchronization, which places requirements on the design of the downlink transmission. For example, for every S subframes or repetitions, the BS transmits a dense segment of dense RRS) for downlink synchronization; and/or, for every S subframes or repetitions, there is a gap during which the UE receives the cell PSS/SSS to obtain the latest downlink synchronization.

In a process of receiving a first portion of repetitions of a downlink transmission, or receiving a second portion of repetitions of a downlink transmission, the UE may receive, per S repetitions, an RRS transmitted by the BS, where S is a positive integer, is predefined or preconfigured by the BS, or is determined based on the RRS pattern and/or RRS period. The RRS is denser in the time domain and/or frequency domain compared to the DMRS of the downlink transmission.

In accordance with Embodiment 2, the BS periodically transmits a dense segment of an RS in a downlink transmission from the UE, i.e., a dense segment of RS every S subframes or repetitions, which is mainly used for re-acquiring or tracking the downlink synchronization and can also be used auxiliary to channel estimation, and this dense segment of an RS can be called an RRS. The RRS is only transmitted while the downlink transmission is transmitted, i.e., the RRS and the downlink transmission are always accompanied. The size of S can be predefined or preconfigured by the BS.

The above-described RRS may include a denser demodulation reference signal (DMRS) relative to a DMRS used for channel estimation in downlink transmissions. The RRS can be denser in the time domain compared to the DMRS, which is useful for frequency synchronization estimation, denser in the frequency domain compared to the DMRS, which is useful for time synchronization estimation, or denser in both time and frequency domains compared to the DMRS, which is useful for both frequency synchronization estimation and time synchronization estimation.

The above RRS may be UE-specific, e.g., the RRS is configured via the UE-specific RRC signaling. The period of the RRS may be predefined or preconfigured by the BS. The frequency domain resources of the RRS can be preconfigured by the BS, i.e., can be different from the frequency domain resources of the downlink transmission, or it is not necessary to configure the frequency domain resources of the RRS, but can use the frequency domain resources of the downlink transmission. The UE determines the position of the RRS resource element (RE) in the downlink transmission resources based on the period and pattern of the RRS, e.g., the RRS and the downlink transmission can be multiplexed within one OFDM symbol by frequency division or within multiple OFDM symbols by time division and frequency division. The RRS can also occupy one OFDM independently and have the same frequency domain resources as the downlink transmission, i.e., the RRS and the downlink transmission are only time division multiplexed.

The above-described RRS may also be cell-specific, e.g., if the RRS is configured through system information, then the resources used for downlink transmission should avoid the RRS in the time domain, and the cell-specific RRS and PSS/SSS have a similar role. If the RRS is configured to a different frequency band from the downlink transmission, e.g., in the eMTC system, the RRS is configured to a different narrowband from the downlink transmission, and in NB-IoT system, the RRS is configured to a different carrier from the downlink transmission, then the UE should switch the frequency band to receive the RRS during the reception of the downlink transmission.

Figure 13:
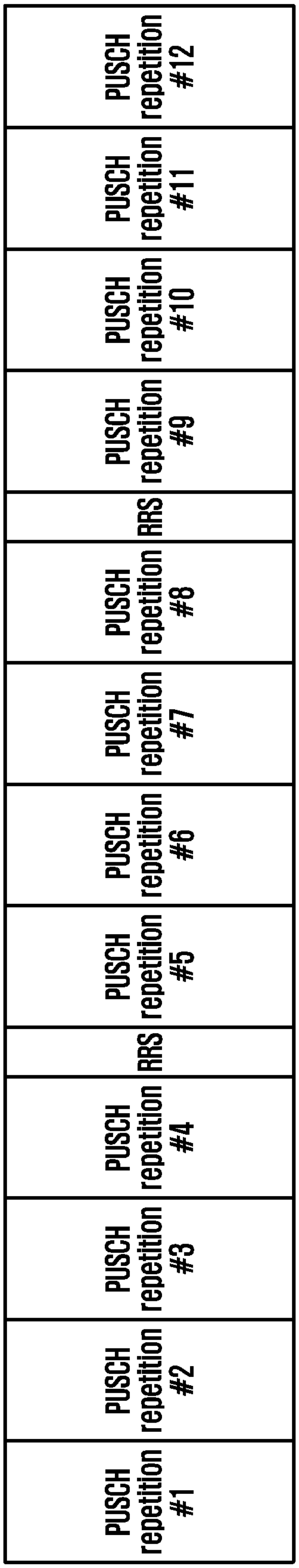
FIG. 13 illustrates a synchronization operation according to an embodiment.

FIG. 13 illustrates a synchronization operation according to an embodiment.

Referring to FIG. 13, a BS transmits a dense segment of an RRS every S PDSCH repetitions, where S=4, i.e., a dense segment of the RRSs between PDSCH repetition #4 and repetition #5, and a dense segment of the RRSs between PDSCH repetition #8 and repetition #9. The RRS between the PDSCH repetition #4 and repetition #5 can be contained within PDSCH repetition #4, and/or repetition #5.

While receiving a first portion of repetitions of a downlink transmission, or receiving a second portion of repetitions of a downlink transmission, there may be one or multiple gaps in the process of receiving the downlink transmission. The UE has no downlink transmission and does not necessarily monitor the PDCCH. The UE receives a downlink synchronization reference signal for acquiring or tracking the downlink synchronization during a gap. the downlink synchronization reference signal may include at least one of a PSS, an SSS, and an RRS.

The time domain position of the gap may be related to at least one of the time domain position of the PSS, the time domain position of the SSS, and the time domain position of the RRS. The length of the gap may be predefined, preconfigured by the BS, or determined by the UE capacity. That is, the length of the gap may be related to the capacity of the UE to acquire or track the downlink synchronization, and if the length of the gap is determined by the capacity of the UE to acquire or track the downlink synchronization, the UE shall report that capacity to the BS.

There may be periodically one or more gaps in the repetitions of the downlink transmission from the UE, and the gaps may include one or more symbols or subframes, e.g., one gap every S subframes or repetitions, without any transmission from that UE during the gap. The UE may receive cell synchronization signals to reacquire or track the downlink synchronization during the gap, so that the time domain position of the gap is related to the time domain position of the PSS and/or the time domain position of the SSS. At least one PSS/SSS should be contained in a gap, and the gap may also contain a processing time for band switch, considering that the UE needs the processing time for band switch. The period of the gap may be the same as the period of the PSS/SSS or a multiple of the period of the PSS/SSS. The period of the gap (i.e., the size of S) may be predefined, preconfigured by the BS, or determined by the PSS/SSS period.

Figure 14:
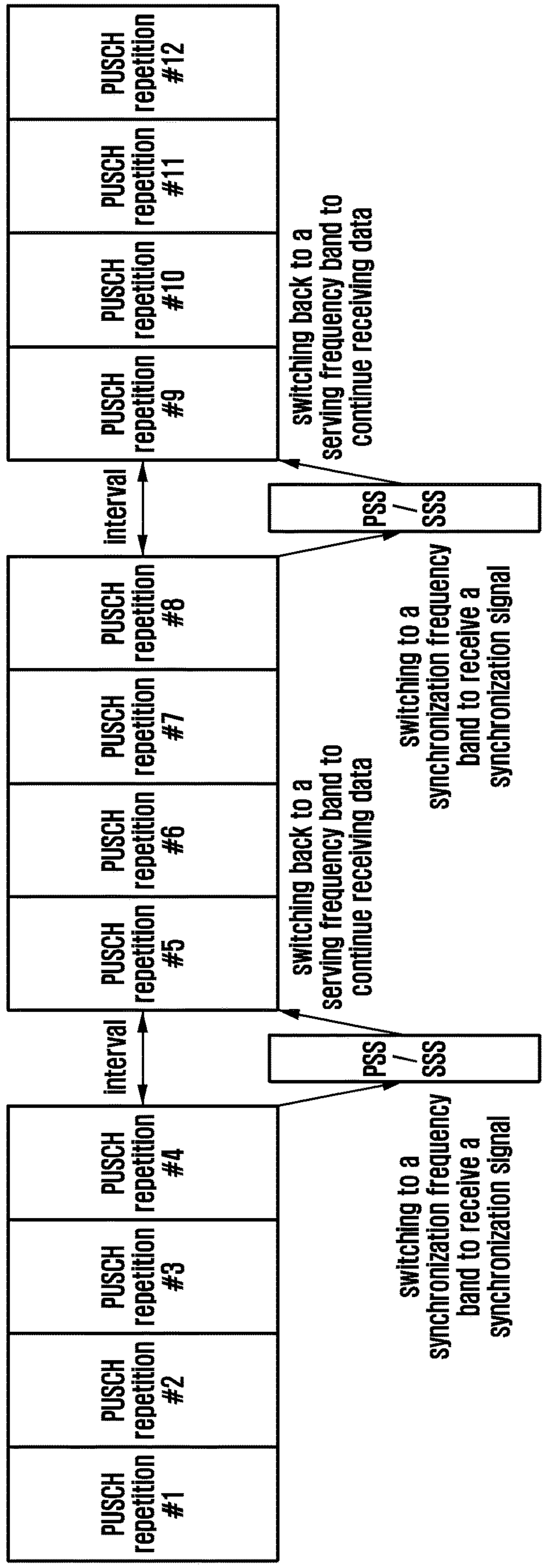
FIG. 14 illustrates a synchronization operation according to an embodiment.

FIG. 14 illustrates a synchronization operation according to an embodiment.

Referring to FIG. 14, there is a gap per S PDSCH repetitions, where S=4, e.g., a gap between PDSCH repetition #4 and repetition #5 where the UE switches to the synchronization frequency band to receive the PSS/SSS and later switches back to the serving frequency band to continue receiving data. Similarly, there is a gap between PDSCH repetition #8 and repetition #9. Alternatively, the time domain position of the first gap may not be the $S^{th}$ PDSCH repetition, but may be related to the time domain start position of the downlink transmission.

In an eMTC system, if the narrowband on which the UE performs the data reception is not the 6 physical resource blocks (PRBs) of the system carrier in the middle, the UE may switch from the serving narrowband to 6 PRBs of the system carrier in the middle during the above gap to receive PSS and/or SSS to acquire or track the downlink synchronization. That is, the time domain position of the gap may be related to the time domain position of the PSS and/SSS.

In an NB-IoT system, if the carrier on which the UE performs the data reception is not the anchor carrier used for cell access, the UE can switch from the serving carrier to the anchor carrier to receive a narrow PSS (NPSS) and/or a narrow SSS (NSSS) to acquire or track the downlink synchronization during the above gap, i.e., the time-domain position of the gap is related to the time domain position of the NPSS and/or the time domain position of the NSSS.

According to the above-described embodiments, the maintaining downlink synchronization during a long UE downlink reception may be achieved.

Half-Duplex Transmission

Figure 15:
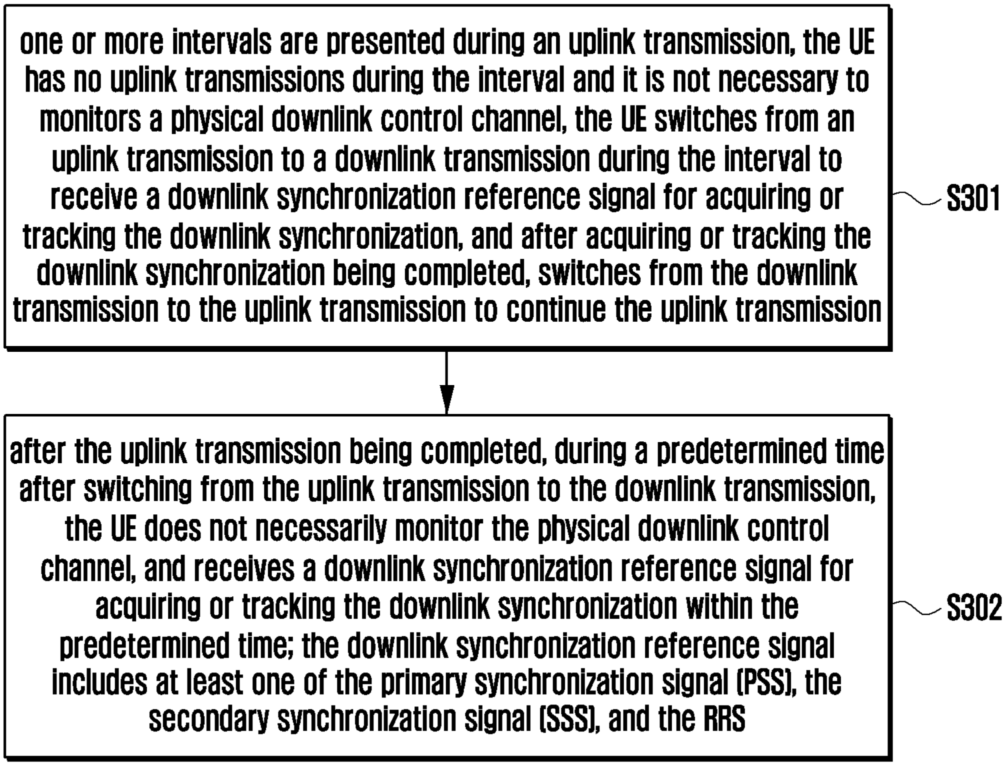
FIG. 15 is a flowchart illustrating a synchronization method according to an embodiment.

FIG. 15 is a flowchart illustrating a synchronization method according to an embodiment. Specifically, FIG. 15 illustrates a synchronization method performed by a half-duplex UE.

Referring to FIG. 15, in step S301, there is one or more gaps during an uplink transmission, and the UE has no uplink transmissions during the gap. As such, it is not necessary for the UE to monitor a PDCCH. Instead, the UE switches from an uplink transmission to a downlink transmission during the gap in order to receive a downlink synchronization reference signal for acquiring or tracking the downlink synchronization. After acquiring or tracking the downlink synchronization being completed, the UE switches back from the downlink transmission to the uplink transmission in order to continue the uplink transmission.

In step S302, after the uplink transmission being completed, during a predetermined time after switching from the uplink transmission to the downlink transmission, the UE does not necessarily monitor the PDCCH, and receives a downlink synchronization reference signal for acquiring or tracking the downlink synchronization during the predetermined time. The downlink synchronization reference signal may include at least one of a PSS, an SSS, and an RRS.

Alternatively, the downlink synchronization reference signal may include at least one of a cell reference signal (CRS), an RRS, a PSS, or an SSS.

In accordance with the above-described embodiments, downlink synchronization may be ensured based on the UE receiving the downlink synchronization reference signal, thereby acquiring or tracking the downlink synchronization.

In an IoT system, due to the limitation of UE cost, most IoT UEs are half-duplex UEs, i.e., they either perform the downlink reception or uplink transmission, but cannot perform downlink reception and uplink transmission at the same time. As UEs may lose the synchronization in downlink after completing a longer uplink transmission, then the UEs should reacquire or track the downlink synchronization for switching to the downlink after completing a long uplink transmission. As the UE may lose the synchronization in downlink during a long uplink transmission, then the UE should switch to the downlink and acquire or track the downlink synchronization during a long uplink transmission.

After a Long Uplink Transmission is Completed. Switching to the Downlink Reception and First Acquiring or Tracking the Downlink Synchronization After completing an uplink transmission with a high number of repetitions, the UE should first receive a CRS, an RRS, and/or a PSS/SSS in order to reacquire or track the downlink synchronization for switching to the downlink, and then starts monitoring the PDCCH after acquiring or tracking the downlink synchronization. The UE may consider that there will be no downlink transmission for a period of time of switching back to the downlink after the uplink transmission is completed, and it is not necessary to monitor the PDCCH during this period of time. The length of the period of time may be predefined, preconfigured by the BS, or determined by the UE capacity. That is, the length of the period of time may be related to the capacity of the UE to acquire or track the downlink synchronization, and if the length of the period of time is determined by the capacity of the UE to acquire or track the downlink synchronization, the UE shall report this capacity to the BS.

In the above-described examples, whether it is necessary for the UE to reacquire or track the downlink synchronization when switching to downlink after completing uplink transmission may be related to the number of repetitions or duration of the uplink transmission, e.g., the UE should reacquire or track the downlink synchronization after the switch to the downlink only when the number of repetitions or duration of the uplink transmission exceeds the threshold value, and does not necessarily monitor the PDCCH for a period of time after the switch to the downlink. The threshold value may be predefined, determined by the UE itself, or preconfigured by the BS.

Switching to the Downlink During a Long Uplink Transmission to Quickly Acquire or Track the Downlink Synchronization Switching from an uplink transmission to a downlink transmission during an uplink transmission to receive a downlink synchronization reference signal for acquiring or tracking the downlink synchronization, may include, when there is one or more gaps in the uplink transmission where the UE has no uplink transmissions and is not required to monitor the PDCCH, the UE switches from the transmission uplink to the downlink transmission in order to receive a downlink synchronization reference signal for acquiring or tracking the downlink synchronization. The time domain position of the gap may be related to at least one of the time domain position of the PSS, the time domain position of the SSS, or the time domain position of the RRS.

The UE may need to switch to the downlink to receive the CRS, RRS, and/or PSS/SSS in order to acquire or track the downlink synchronization in the uplink transmission process with many repetitions, and switch back to the uplink to continue performing transmission after acquiring or tracking the downlink synchronization, which requires a corresponding gap in the UE's uplink transmission during which the UE has no uplink transmission and is not required to monitor the PDCCH. For example, there is a gap per K PUSCH repetitions or subframes where the UE switches to the downlink to receive the CRS, RRS, and/or PSS/SSS in order to acquire or track the downlink synchronization. The time domain position of the gap may be related to the time domain position of the CRS, RRS, and/or the PSS/SSS. The length of the gap may be predefined, preconfigured by the BS, or determined by the UE capacity. That is, the length of the gap may be related to the capacity of the UE to acquire or track the downlink synchronization, and if the length of the gap is determined by the capacity of the UE to acquire or track the downlink synchronization, the UE shall report that capacity to the BS.

Figure 16:
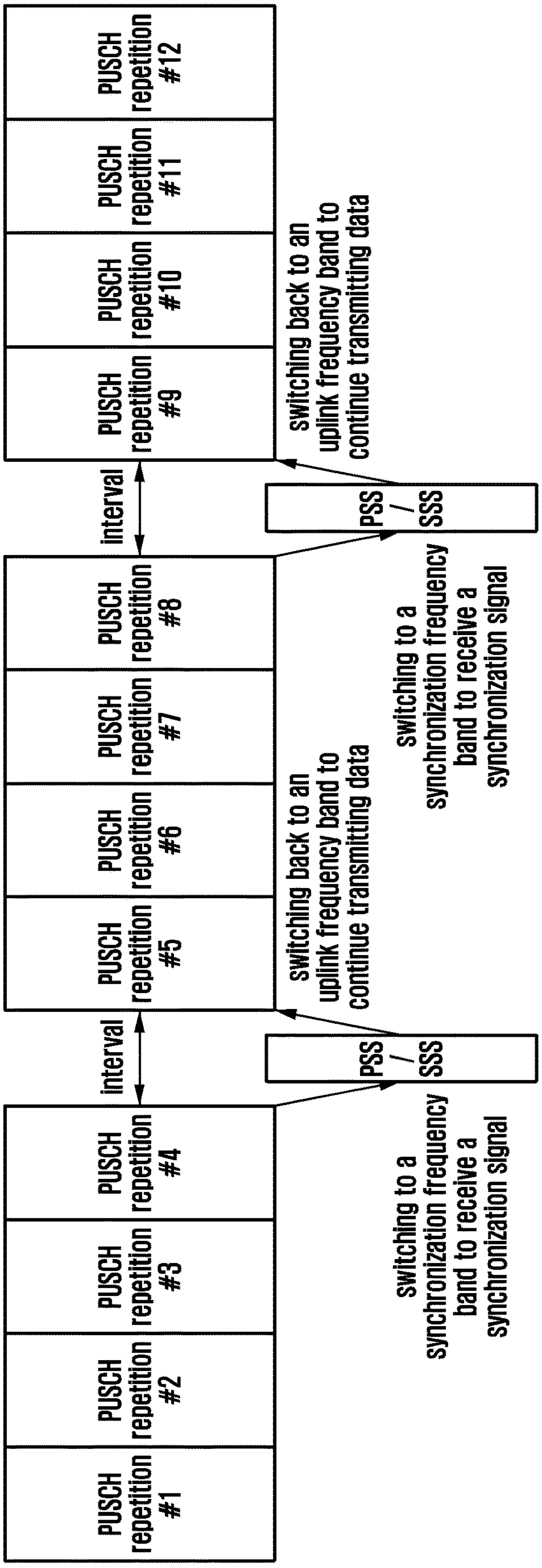
FIG. 16 illustrates a synchronization operation according to an embodiment.

FIG. 16 illustrates a synchronization operation according to an embodiment.

Referring to FIG. 16, there is a gap per K PUSCH repetitions, where K=4, e.g., a gap between PUSCH repetition #4 and repetition #5 where the UE switches to the downlink frequency band to receive the PSS/SSS and later switches back to the uplink frequency band to continue transmitting PUSCH repetitions. Similarly, a gap exists between PUSCH repetition #8 and repetition #9. Alternatively, the time domain position of the first gap may not be the $M^{th}$ PUSCH repetition, but may be related to the time domain start position of the PUSCH transmission. Alternatively, the PSS/SSS can instead be the CRS, RRS and/or PSS/SSS.

Range Control of TA in TDD Systems

FIG. 17 is a flowchart illustrating a synchronization method for a TDD system according to an embodiment. Specifically, FIG. 17 illustrates a synchronization method for TDD systems, performed by a BS.

Referring to FIG. 17, in step S401, by configuring the cell common TA, the TA values used by all UEs in the cell for uplink transmission are controlled to be within a range of k×10 ms~(k×10 ms+GP), or are controlled to be within a range of k×5 ms~(k×5 ms+GP), where k is a positive integer, and GP is the length in time of the guard gap contained within the special subframe of the TDD system. The TA value used by the UE for uplink transmission may be equal to the sum of the true TA and the cell common TA.

In accordance with the above-described embodiments, the BS may avoid collision of uplink and downlink signals in TDD systems and does not expand the GP.

In an existing LTE TDD system, the start position of an uplink pilot time slot (UpPTS) transmitted by the UE in advance of TA will fall into the GP of the special subframe of the downlink timing.

Figure 18:
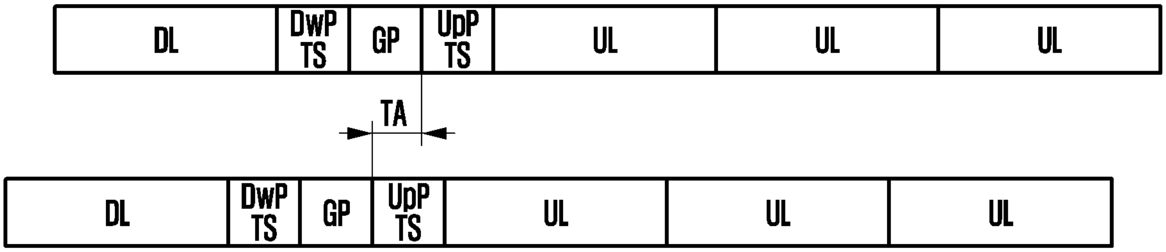
FIG. 18 illustrates synchronization for a TDD system according to an embodiment.

FIG. 18 illustrates synchronization for a TDD system according to an embodiment.

Referring to FIG. 18, the range of the TA is O-GP, and GP is length in time of the guard gap of the special subframe. Accordingly, the uplink signal transmitted by the advance TA will not interfere with the downlink signal of the same cell. In FIG. 18, the GP is between the UpPTS and a downlink pilot time slot (DwPTS).

In an IoT-based NTN, due to the increase of the TA, the TA may exceed the GP of the special subframe, and if the uplink subframe transmitted by the UE in advance of TA overlaps with the downlink subframes of downlink timing, then it will cause mutual interference between uplink and downlink signals in the same cell, and the GP should be increased to ensure 0<TA<GP, with the disadvantage that GP will be very large and will cause serious waste to the system resources.

In accordance with an embodiment, to avoid collision of uplink and downlink signals in TDD systems without expanding the GP, a method is provided to restrict the start position of the UpPTS transmitted by the advance TA falling into the GP of a special subframe of another radio frame. For example, if the frame structure of TDD LTE has a 10 ms period, then the range of the TA is k×10 ms~(k×10 ms+GP), where k is a positive integer, and the GP is the length of the guard gap within the special subframe of the existing TDD frame structure. If the uplink and downlink switching points of TDD LTE have a 5 ms period, and the uplink and downlink allocation of the first and second half of the subframe are exactly the same, then the range of TA can be k×ms~(k×5 ms+GP), where k is a positive integer.

Figure 19:
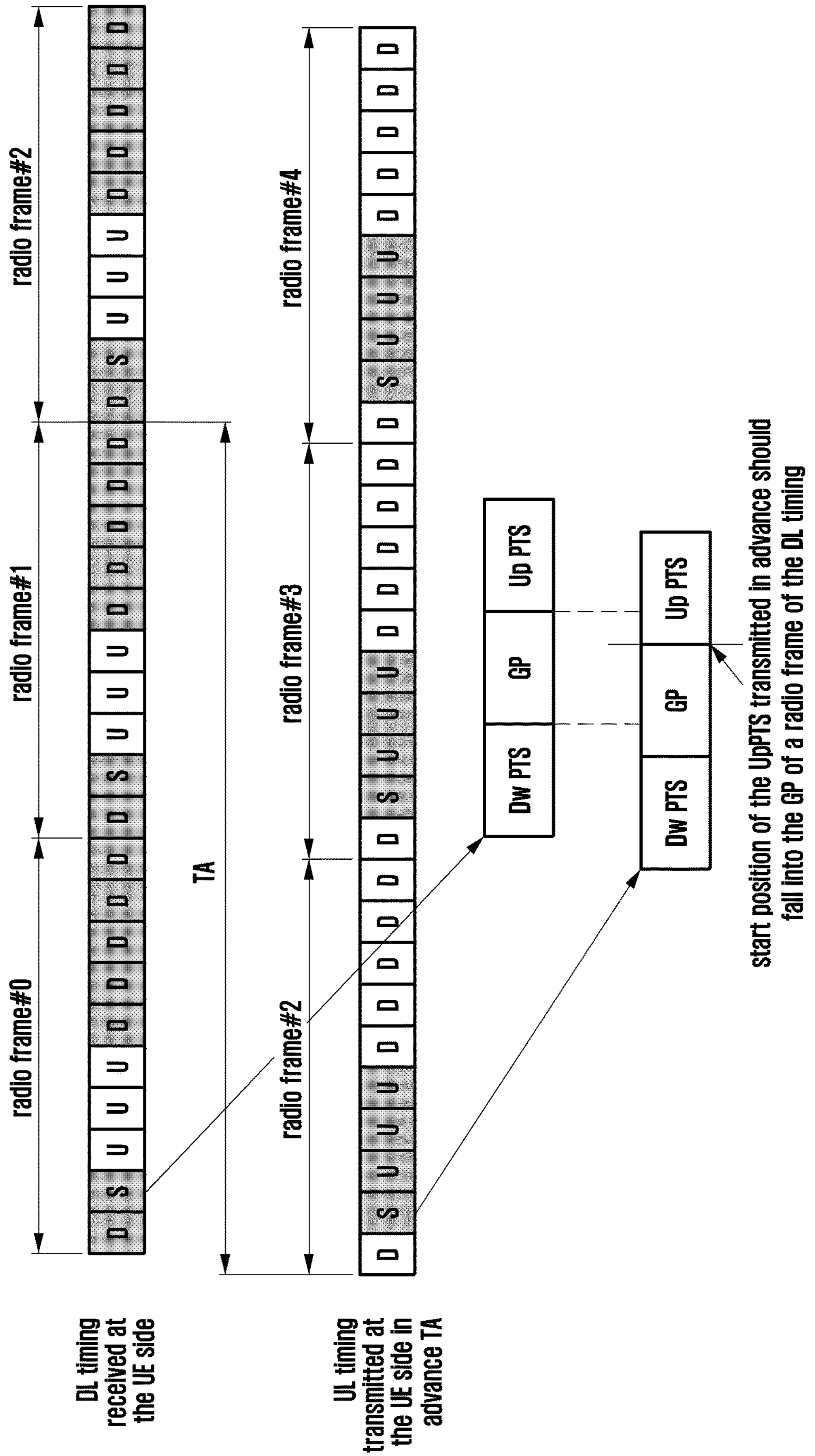
FIG. 19 illustrates synchronization for a TDD system according to an embodiment.

FIG. 19 illustrates synchronization for a TDD system according to an embodiment.

Referring to FIG. 19, for all UEs in the cell, the UpPTS start position of radio frame #2 transmitted by the advance TA should all fall into the GP of the special subframe of radio frame #0, i.e., the TA range is 2×10 ms~(2×10 ms+GP).

Even if the true TA (2 times the transmission delay between the UE and the BS) is not in the range of k×10 ms~(k×10 ms+GP), by implementing or configuring a common TA, the BS can also control the TA used by the UE within k×10 ms~(k×10 ms+GP). That is, the TA used by the UE may not be the true TA, i.e., it is not equal to two times the transmission delay between the BS and the UE. For example, the common TA may be used as the advance transmit amount for a PRACH transmission, and the TA used by the UE can include the common TA. The TA may be indicated by the BS via a random access response (RAR) and/or the TA may be estimated by the UE itself, so the BS can control the TA used by the UE by configuring the value of the common TA to be within k×10 ms~(k×10 ms+GP). As a result, the uplink time on the BS side is not aligned with the downlink time, which can be overcome by the BS implementation.

Figure 20:
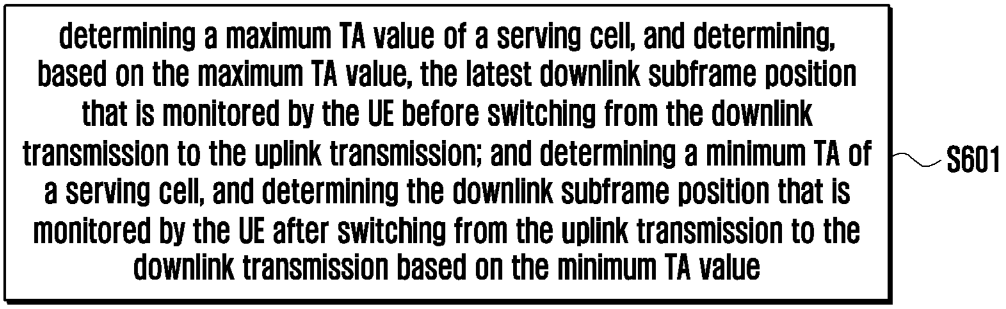
FIG. 20 is a flowchart illustrating a method for determining a monitoring position of a downlink subframe according to an embodiment.

The UE Estimates the TA Autonomously but does not Report the Estimated TA to the BS; the UE does not Necessarily Determine the Latest Downlink Subframe Position that is Monitored Before Switching from the Downlink Transmission to the Uplink Transmission, and the Earliest Downlink Subframe Position that is Monitored after Switching from the Uplink Transmission to the Downlink Transmission FIG. 20 is a flowchart illustrating a method for determining a monitoring position of a downlink subframe according to an embodiment. Specifically, FIG. 20 illustrates a method for determining a downlink subframe monitoring position, performed by a half-duplex UE.

Referring to FIG. 20, in step S601, the UE determines a maximum TA value of a serving cell, and determines, based on the maximum TA value, the latest downlink subframe position that is monitored by the UE before switching from the downlink transmission to the uplink transmission. The UE determines a minimum TA of a serving cell, and determines the downlink subframe position that is monitored by the UE after switching from the uplink transmission to the downlink transmission based on the minimum TA value.

A maximum TA value and/or a minimum TA value of the serving cell may be determined based on the indication of the system information.

Assuming that the uplink transmission uses the maximum TA, determining a corresponding moment of the switch from the downlink transmission to the uplink transmission, after the moment, and before the actual moment of the switch from the downlink transmission to the uplink transmission, it is not necessary to monitor the downlink subframe.

Assuming that the uplink transmission uses the minimum TA, determining the corresponding moment of the switch to the downlink transmission after completing the uplink transmission before the moment, and after the actual moment of the switch to the downlink transmission after completing the uplink transmission, it is not necessary to monitor the downlink subframe.

In accordance with the above-described embodiments, power consumption is saved by avoiding the unnecessary downlink monitoring by the UE. Further, the power consumption of the TA estimation, as well as the signaling overhead and power consumption reported by the TA are reduced.

A half-duplex UE cannot perform downlink reception while executing the uplink transmission, so the BS cannot schedule the UE during the uplink transmission time of the half-duplex UE in order to avoid the waste of the downlink resources. If the BS knows the specific value of the TA used by the UE, then the BS can determine a start time and an end time of the UE performing the uplink transmission, in order to precisely avoid scheduling and downlink data transmission to the UE during the uplink transmission time, i.e., not to transmit any downlink channel/signal of the UE during the uplink transmission period. If the BS does not know the specific value of the TA used by the UE, then the BS cannot determine the start time and the end time of the UE to perform the uplink transmission, and thus, cannot precisely avoid scheduling and downlink data transmission to the UE during the uplink transmission period.

The UE may not report the autonomously estimated TA to the BS, i.e. the BS does not know the specific value of the TA used by the UE, and thus, does not know the exact start time and exact end time of the UE uplink transmission. Therefore, in order to avoid unnecessary downlink scheduling, the BS may assume that the UE uses the cell maximum TA to determine the start time of the UE uplink transmission, and thus, determine the UE's latest schedulable downlink subframe position before performing the uplink transmission. Correspondingly, in order to save the power consumption of unnecessary downlink monitoring by the UE, the UE assumes that the maximum TA is used to determine the latest schedulable downlink subframe position of the BS before the UE performs the uplink transmission, and the downlink subframe after the latest schedulable subframe position without monitoring the BS and before uplink transmission.

Similarly, the BS may assume that the UE uses the cell minimum TA to determine the end time of the UE uplink transmission and then determine the earliest schedulable downlink subframe position of the UE after performing the uplink transmission, which is related to the number of repetitions of the UE's uplink transmission, i.e., it must be guaranteed after the UE completes the uplink transmission. Correspondingly, in order to save the UE unnecessary power consumption for downlink monitoring, the UE assumes that the minimum TA is used to determine the earliest schedulable downlink subframe position of the BS after the UE completes the uplink transmission and the downlink subframe after the uplink transmission without monitoring the BS and before uplink transmission and before the earliest subframe position that the BS can schedule.

Figure 21:
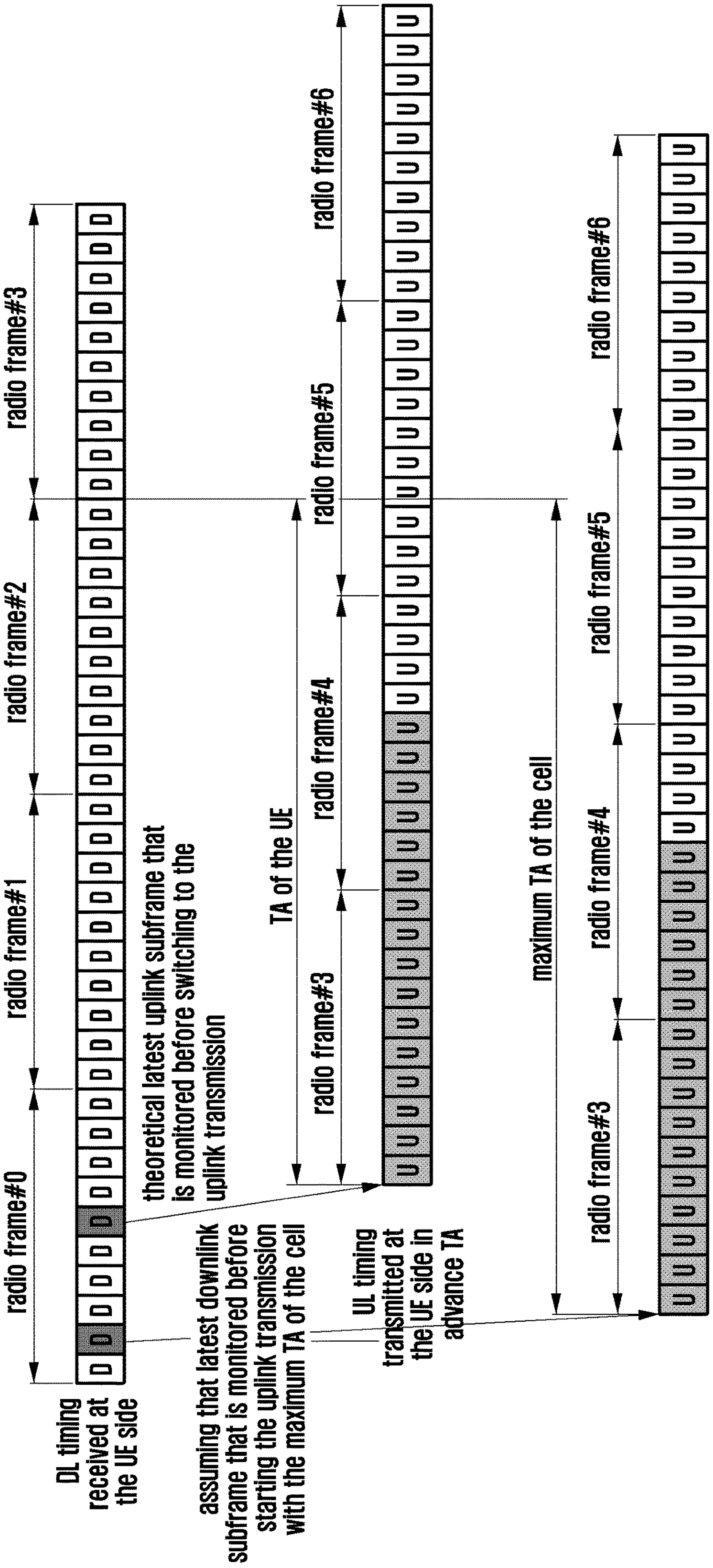
FIG. 21 illustrates an operation for determining a monitoring position of a downlink subframe according to an embodiment.

FIG. 21 illustrates an operation for determining a monitoring position of a downlink subframe according to an embodiment.

Referring to FIG. 21, the half-duplex UE is scheduled to start an uplink transmission with a repetition number of 16 (i.e., lasting 16 subframes) in the first subframe of radio frame #3, and the theoretical latest subframe of the UE that the BS can schedule before the UE switches to uplink transmission is the sixth subframe of radio frame #0, provided that the BS knows the specific value of the TA used by the UE, and if the BS does not know the specific value of TA used by the UE, in order to avoid premature scheduling of the UE, the BS can assume the extreme case that the UE transmits the uplink transmission with the maximum TA of the cell. Accordingly, the latest subframe of the UE that the BS can schedule should be the second subframe of radio frame #0, regardless of the specific TA value of the UE, and the UE is in time to receive the schedule. Correspondingly, the UE can stop monitoring the PDCCH after the second subframe of radio frame #0 before switching to the uplink transmission without monitoring the subframes after it, i.e., without monitoring the third, fourth, fifth, and sixth subframes of radio frame #0.

Figure 22:
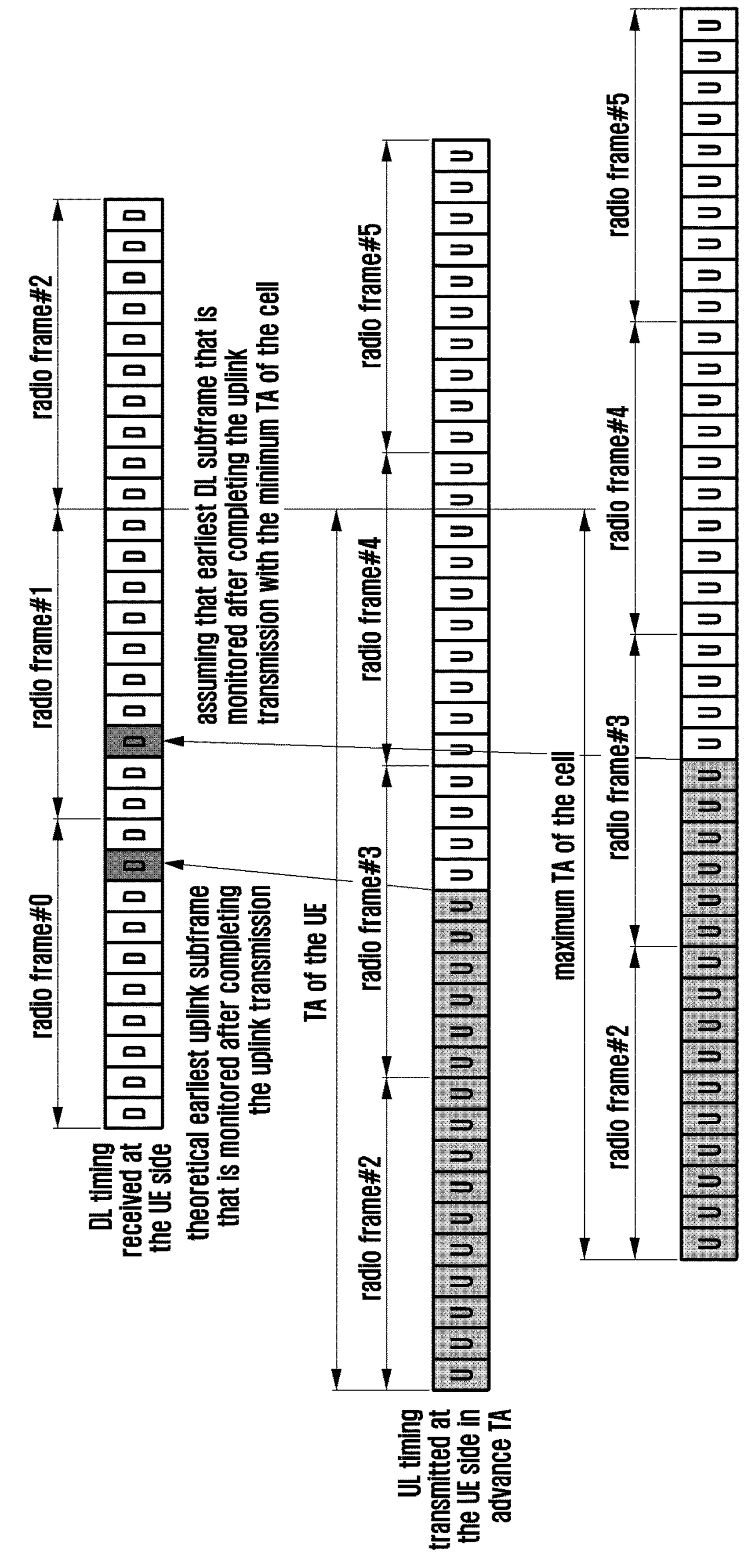
FIG. 22 illustrates an operation for determining a monitoring position of a downlink subframe according to an embodiment.

FIG. 22 illustrates an operation for determining a monitoring position of a downlink subframe according to an embodiment.

Referring to FIG. 22, the half-duplex UE is scheduled to start an uplink transmission with a repetition number of 16 (i.e., lasting 16 subframes) in the first subframe of radio frame #2. After the UE completes the uplink transmission, the earliest subframe of the UE that the BS can theoretically schedule is the 9th subframe of radio frame #0, provided that the BS knows the specific value of the TA used by the UE. If the BS does not know the specific value of the TA used by the UE, in order to avoid premature scheduling of the UE, the BS can assume the extreme case that the UE transmits the uplink transmission with the minimum TA of the cell. Thereafter, the BS can transmit the scheduling of the UE in the third subframe of radio frame #1 at the earliest, regardless of the specific value of the TA of the UE, and the UE can receive the scheduling in time. Correspondingly, the UE can start monitoring the PDCCH in the third subframe of radio frame #1 after the uplink transmission is completed, without monitoring its previous subframes, i.e., without monitoring the 9th-10th subframes of radio frame #0, and the 1st-2nd subframes of radio frame #1.

In accordance with the embodiments in FIGS. 21 and 22, the BS should inform the UE of the maximum TA and the minimum TA of the cell, e.g., the BS can broadcast the maximum TA and minimum TA of the cell via system information. However, it is not necessary for the BS to inform the UE of the specific values of the maximum TA and minimum TA, as the BS may quantify the maximum TA and minimum TA by rounding up the subframe length (1 ms) as the granularity and then inform the UE of the quantified values.

Figure 23:
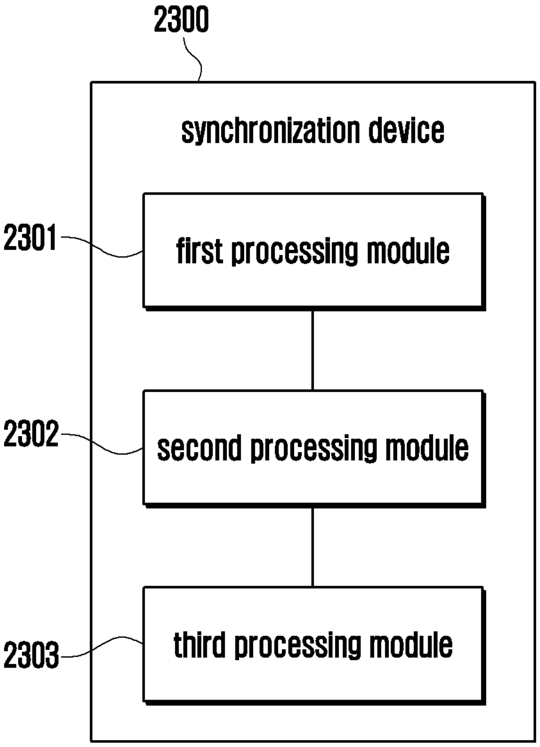
FIG. 23 illustrates a synchronization device according to an embodiment.

FIG. 23 illustrates a synchronization device according to an embodiment. Specifically, based on similar concepts as the embodiments in FIGS. 21 and 22, FIG. 23 provides a synchronization device, i.e., a UE.

Referring to FIG. 23, a synchronization device 2300 includes a first processing module 2301, a second processing module 2302, and a third processing module 2303.

The first processing module 2301 transmits a first portion of repetitions of an uplink transmission based on a first value of an uplink synchronization parameter. The first portion of repetitions may include a single repetition or multiple repetitions.

The second processing module 2302 determines a second value of the uplink synchronization parameter by adjusting the uplink synchronization parameter.

The third processing module 403 transmits a second portion of repetitions of the uplink transmission based on the second value of the uplink synchronization parameter. The second portion of repetitions may include a single repetition or multiple repetitions.

The uplink synchronization parameter may include at least one of a TA or a pre-compensated uplink frequency offset.

The uplink synchronization parameter may be adjusted when at least one of the following conditions is met:

- the UE has a capacity of adjusting the uplink synchronization parameter during the transmission of the uplink transmission
- the BS configures the UE to adjust the uplink synchronization parameter during the transmission of the uplink transmission; or
- the number of repetitions of the uplink transmission is greater than a first threshold value.

The second processing module 2302 may be configured to perform any of the following:

- adjusting the TA according to a drift rate of the TA, which is preconfigured by the BS or estimated by the UE;
- adjusting the pre-compensated uplink frequency offset according to a drift rate of a Doppler frequency, which is preconfigured by the BS, or estimated by the UE;
- adjusting the TA according to the TA adjustment command transmitted by the BS; or
- adjusting the pre-compensated uplink frequency offset according an uplink frequency offset adjustment command transmitted by the BS.

The second processing module 402 may be configured to adjust a TA per M repetitions periodically during the transmission of the uplink transmission, and/or adjust a pre-compensated uplink frequency offset per N repetitions periodically. M may be predefined, preconfigured by the BS, or determined based on the drift rate of the TA. N may be predefined, preconfigured by the BS, or determined based on the drift rate of the uplink Doppler frequency. M and N are positive integers.

M is greater than or equal to a third value and N is greater than or equal to a fourth value. The third value and the fourth value may be predefined, preconfigured by the BS, or determined based on an UE capacity.

While transmitting a first portion of repetitions of an uplink transmission, or transmitting a second portion of repetitions of an uplink transmission, if there is a gap per M repetitions, the UE has no uplink transmissions during the gap, and is not required to monitor the PDCCH, the UE may adjust the uplink synchronization parameter during the gap, which is predefined or preconfigured by the BS.

When the tail of the first portion of repetitions overlaps the head of the second part of the repetition, the overlapped part of the tail of the portion of repetitions or the overlapped part of the head of the second portion of repetitions may be dropped.

In accordance with the above-described embodiment, the UE may adjust the uplink synchronization parameter during the transmission of an uplink transmission, determine the second value of the uplink synchronization parameter, and transmit the second portion of repetitions of the uplink transmission based on the second value of the uplink synchronization parameter, thereby maintaining the uplink synchronization during the uplink transmission.

Figure 24:
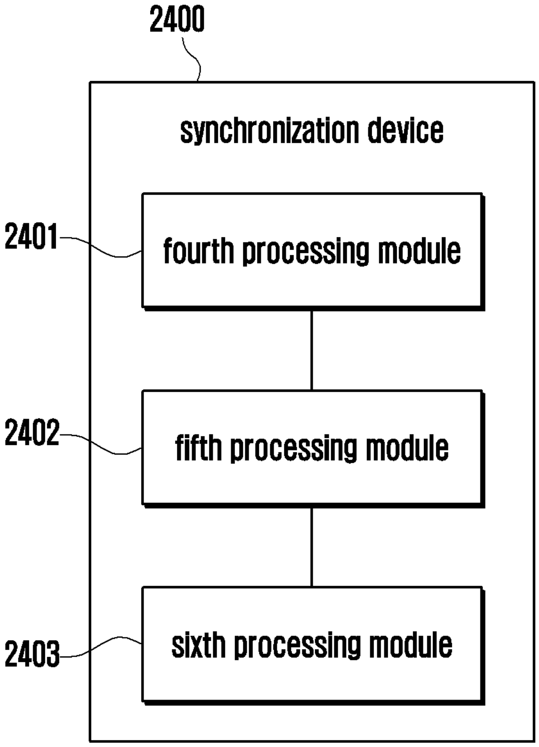
FIG. 24 illustrates a synchronization device according to an embodiment.

FIG. 24 illustrates a synchronization device according to an embodiment. Specifically, FIG. 24 illustrates a synchronization device, i.e., a UE.

Referring to FIG. 24, the synchronization device 2400 includes a fourth processing module 2401, a fifth processing module 2402, and a sixth processing module 2403.

- a fourth processing module 2401 receives a first portion of repetitions of the downlink transmission based on the first value of the downlink synchronization parameter. The first portion of repetitions may include a single repetition or multiple repetitions.
- a fifth processing module 2402 adjusts the downlink synchronization parameter and determine a second value of the downlink synchronization parameter.

A sixth processing module 2403 receives a second portion of repetitions of the downlink transmission based on a second value of the downlink synchronization parameter. The second portion of repetitions may include a single repetition or multiple repetitions.

The downlink synchronization parameter may include at least one of a downlink timing or a compensated downlink frequency offset.

Adjusting the downlink synchronization parameter may be performed when at least one of the following conditions is met:

- the UE has a capacity of adjusting the downlink synchronization parameter during the reception of the downlink transmission;
- the BS configures the UE to adjust the downlink synchronization parameter during the reception of downlink transmissions; or
- the number of repetitions of the downlink transmission is greater than a second threshold value.
- the fifth processing module 2402 is configured to perform any of the following methods:
- adjusting the downlink timing according to the drift rate of the downlink timing, which is preconfigured by the BS, estimated by the UE, or equal to the TA drift rate.
- adjusting the compensated downlink frequency offset according to the drift rate of the Doppler frequency, which is preconfigured by the BS, estimated by the UE, or equal to the drift rate of the uplink Doppler frequency.

While receiving a first portion of repetitions of a downlink transmission, or receiving a second portion of repetitions of a downlink transmission, per S repetitions, an RRS transmitted by the BS may be received, where S is a positive integer, which is predefined, preconfigured by the BS, or determined based on the RRS pattern and/or RRS period. The RRS is denser in the time domain and/or frequency domain as compared to the DMRS of the downlink transmission.

While receiving a first portion of repetitions of a downlink transmission, or receiving a second portion of repetitions of a downlink transmission, if there is one or more gaps during the reception of the downlink transmission, the UE has no downlink transmission during a gap, and is not required to monitor the PDCCH, the UE may receive a downlink synchronization reference signal for acquiring or tracking a downlink synchronization during a gap. The downlink synchronization reference signal may include at least one of a PSS, an SSS, and an RRS. The time domain position of the gap may be related to at least one of the time domain position of PSS, the time domain position of the SSS, and the time domain position of the RRS.

In accordance with the above-described embodiments, the UE may adjust the downlink synchronization parameters during the transmission of a downlink transmission, determine the second value of the downlink synchronization parameter, and transmit the second portion of repetitions of the downlink transmission based on the second value of the downlink synchronization parameter, thereby maintaining the downlink synchronization during the downlink transmission.

Figure 25:
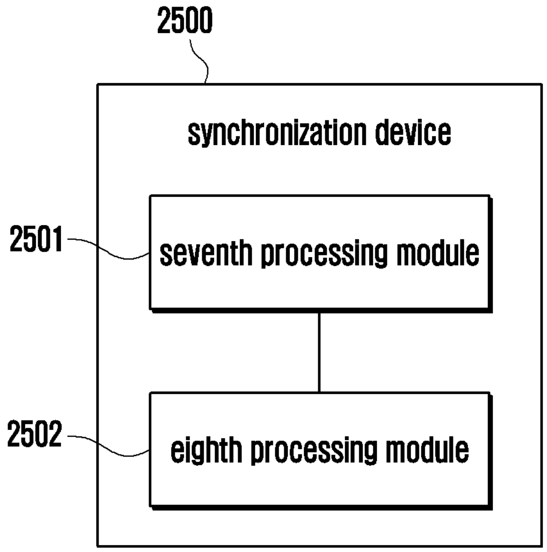
FIG. 25 illustrates a synchronization device according to an embodiment.

FIG. 25 illustrates a synchronization device according to an embodiment. Specifically, FIG. 25 illustrates a synchronization device, i.e., a half-duplex UE.

Referring to FIG. 25, a synchronization device 2500 includes a seventh processing module 2501 and an eighth processing module 2502.

The seventh processing module 2501, when there is one or more gaps during an uplink transmission, the UE has no uplink transmissions during the gap, and is not required to monitor the PDCCH, switches the synchronization device 2500 from an uplink transmission to a downlink transmission during the gap in order to receive a downlink synchronization reference signal for acquiring or tracking a downlink synchronization. After completing acquiring or tracking a downlink synchronization, the seventh processing module 2501 switches the synchronization device 2500 from the downlink transmission to the uplink transmission to continue the uplink transmission;

An eighth processing module 2502, during a predetermined time after completion of the uplink transmission and after switching from the uplink transmission to the downlink transmission, does not necessarily monitor the PDCCH and receives a downlink synchronization reference signal for acquiring or tracking a downlink synchronization during the predetermined time. The downlink synchronization reference signal may include at least one of a PSS, an SSS, and an RRS.

Alternatively, the downlink synchronization reference signal may include at least one of a CRS, an RRS, a PSS, and an SSS.

- the seventh processing module 2501, if there is one or more gaps in the uplink transmission, the UE has no uplink transmission during the gap, and is not required to monitor the PDCCH, may switch the synchronization device 2500 from the uplink transmission to the downlink transmission during the gap in order to receive a downlink synchronization reference signal for acquiring or tracking a downlink synchronization. The time domain position of the gap may be related to at least one of a time domain position of the PSS, a time domain position of the SSS and a time domain position of the RRS.

In accordance with the above-described embodiments, the downlink synchronization may be ensured based on the UE receiving the downlink synchronization reference signal and thus acquiring or tracking the downlink synchronization.

Figure 26:
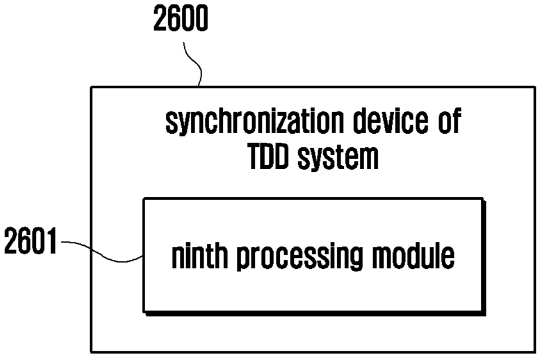
FIG. 26 illustrates a synchronization device for a TDD system according to an embodiment.

FIG. 26 illustrates a synchronization device for a TDD system according to an embodiment. Specifically, FIG. 26 illustrates a synchronization device for a TDD system, i.e., a BS.

Referring to FIG. 26, a synchronization device 2600 for a TDD system includes a ninth processing module 2601.

A ninth processing module 2601 may control the TA values of all UEs in the cell for uplink transmission, by configuring the cell common TA, to be within a range of k=10 ms~(k×10 ms+GP) or within a range of k×5 ms~(k×5 ms+GP), where k is a positive integer, and GP is the length in time of the guard gap contained within the special subframe of the TDD system. The TA value used by the UE for uplink transmission may be the sum of the true TA and the cell common TA.

In accordance with above-described embodiment, collision of uplink and downlink signals in TDD systems can be avoided, without expanding the GP.

Figure 27:
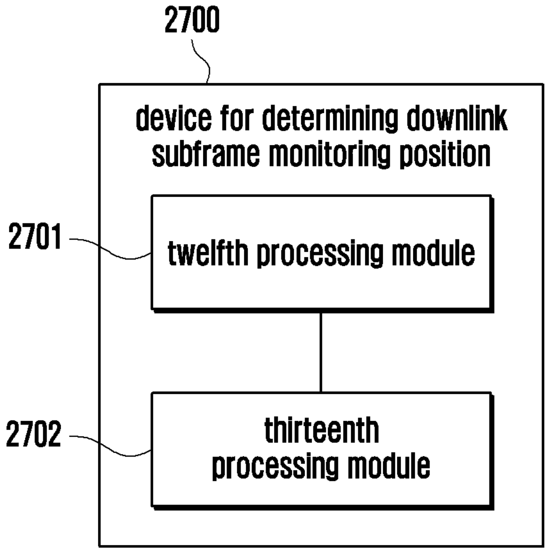
FIG. 27 illustrates a device for determining a monitoring position of a downlink subframe according to an embodiment.

FIG. 27 illustrates a device for determining a monitoring position of a downlink subframe according to an embodiment. Specifically, FIG. 27 illustrates a UE device for determining a downlink subframe monitoring position.

Referring to FIG. 27, a UE device 2700 for determining a downlink subframe monitoring position includes a twelfth processing module 2701 and a thirteenth processing module 2702.

A twelfth processing module 2701 determines a maximum TA value for a serving cell, and determines the latest downlink subframe position that the UE monitors before switching from the downlink transmission to the uplink transmission based on the maximum TA value.

A thirteenth processing module 2702 determines a minimum TA of the serving cell, and determines the earliest downlink subframe position that the UE monitors after switching from the uplink transmission to the downlink transmission based on the minimum TA value.

The maximum TA value and/or the minimum TA value of the serving cell may be determined based on the indication of the system information.

Assuming that the uplink transmission uses the maximum TA, determining the corresponding moment of the switch from the downlink transmission to the uplink transmission, after the moment, and before the actual moment of the switch from the downlink transmission to the uplink transmission, it is not necessary monitor the downlink subframe.

Assuming that the uplink transmission uses the minimum TA, determining the corresponding moment of the switch to the downlink transmission after completing the uplink transmission, and after the actual moment of the switch to the downlink transmission after completing the uplink transmission, it is not necessary to monitor the downlink subframe.

In accordance with the above-described embodiment, power consumption is reduced by avoiding unnecessary downlink monitoring by the UE.

Figure 28:
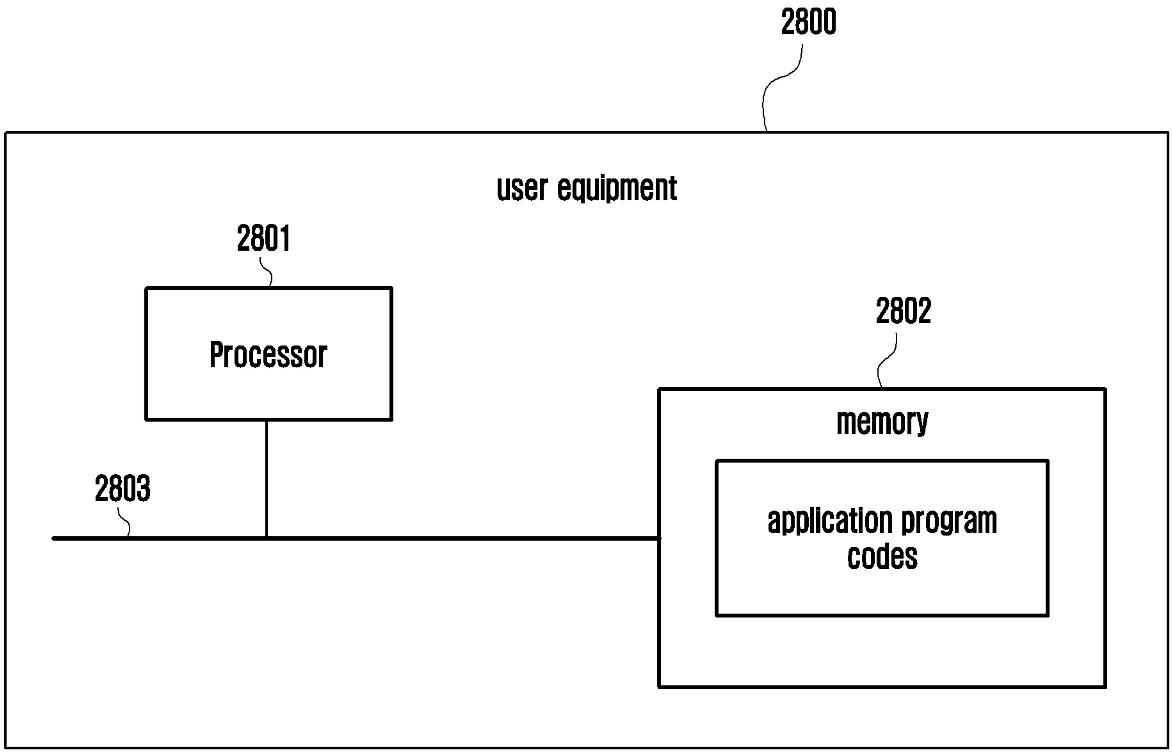
FIG. 28 illustrates a user device according to an embodiment.

FIG. 28 illustrates a user device according to an embodiment.

Referring to FIG. 28, a user device 2800 includes a processor 2801, a memory 2802, and a bus 2803. The processor 2801 is electrically connected to the memory 2802, which is configured to store at least one computer-executable instruction. The processor 2801 is configured to execute the at least one computer-executable instruction in order to perform the steps of any of methods of the above-described embodiments or any one of the optional implementations.

Further, the processor 2801 may include a field-programmable gate array (FPGA) or other devices with logic processing capacity, such as a microcontroller unit (MCU), or a CPU.

In accordance with the above-described embodiment, the uplink synchronization may be maintained during the uplink transmission or the downlink synchronization during the downlink transmission of the UE.

Figure 29:
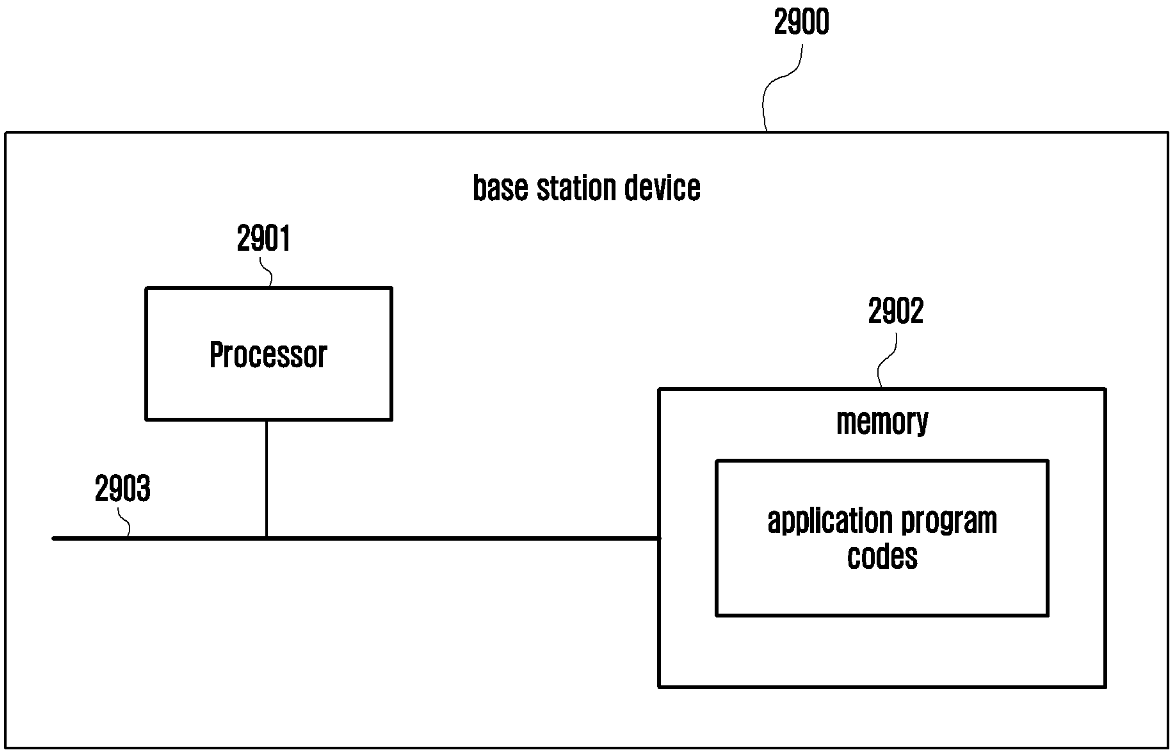
FIG. 29 illustrates a BS apparatus according to an embodiment.

FIG. 29 illustrates a BS apparatus according to an embodiment.

Referring to FIG. 29, a BS apparatus 2900 includes a processor 2901, a memory 2902, and a bus 2903. The processor 2901 is electrically connected to the memory 2902, which is configured to store at least one computer-executable executable instructions. The processor 2901 is configured to execute the at least one computer executable instruction, thereby performing the steps of any method of the above-described embodiments or any one of the optional implementations.

In accordance with the above-described embodiment, the uplink synchronization may be maintained during the uplink transmission or the downlink synchronization during the downlink transmission of the UE.

In accordance with an embodiment, the disclosure also provides a computer readable storage medium storing a computer program that is used to implement the steps of any one of the methods provided in any one of the above-described embodiments or any one of the optional implementations, when executed by a processor.

The computer readable storage media may include, but is not limited to, any type of disk (including floppy disks, hard disks, CD-ROMs, and magnetic disks), ROM, RAM, erasable programmable ROM (EPROM), electrically erasable programmable ROM (EEPROM), flash memory, magnetic cards, or light cards. That is, a readable storage medium includes any medium on which information is stored or transmitted by a device (e.g., a computer) in a form capable of being read.

It should be understood by those skilled in the art that the disclosure provides apparatuses for performing one or more of operations as described in the disclosure. The apparatuses may be specially designed and manufactured as intended, or may include well known apparatuses in a general-purpose computer. The apparatuses may have computer programs stored therein, which are selectively activated or reconstructed. Such computer programs may be stored in device (such as a computer) readable media or in any type of media suitable for storing electronic instructions and respectively coupled to a bus. As described above, readable media include any media storing or transmitting information in device (e.g., computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

In accordance with the above-described embodiments, a UE may adjust an uplink synchronization parameter during an uplink transmission, determine a second value of the uplink synchronization parameter, and transmit a second portion of repetitions of the uplink transmission based on the second value of the uplink synchronization parameter, thereby maintaining the uplink synchronization during the uplink transmission.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a user equipment (UE) in a communication system, the method comprising:

receiving, from a base station, a first configuration of a portion of an adjustment time unit for uplink transmissions in a non-terrestrial network (NTN);

identifying a first number of subframes corresponding to the portion based on the first configuration; and transmitting, to the base station, the uplink transmissions on a plurality of subframes corresponding to a plurality of portions based on adjusting a timing advance per each of the plurality of portions among the plurality of subframes on which the uplink transmissions are transmitted, wherein each of the plurality of portions corresponds to the first number of subframes.

2. The method of claim 1, wherein the first configuration indicates the first number.

3. The method of claim 1, wherein the uplink transmissions are based on adjusting frequency pre-compensation per each of the plurality of portions, wherein the frequency pre-compensation is for Doppler frequency drift in the NTN, and wherein the frequency pre-compensation is based on positioning information of the UE and satellite ephemeris information.

4. The method of claim 1, wherein the uplink transmissions are narrowband physical uplink shared channel (NPUSCH) transmissions on a second number of subframes.

5. The method of claim 1, further comprising receiving, from the base station, a second configuration of a gap between the plurality of portions, and wherein the gap is not used for transmission of the uplink transmissions.

6. The method of claim 5, further comprising transmitting, to the base station, capability information on a gap length of the gap supported by the UE, and wherein the second configuration is based on the capability information.

7. A user equipment (UE) in a communication system, the UE comprising:

a transceiver; and a processor coupled with the transceiver and configured to:

receive, from a base station, a first configuration of a portions of an adjustment time unit for uplink transmissions in a non-terrestrial network (NTN), identify a first number of subframes corresponding to the portions based on the first configuration, and transmit, to the base station, the uplink transmissions on a plurality of subframes corresponding to a plurality of portions based on adjusting a timing advance per each of the plurality of portions among the plurality of subframes on which the uplink transmissions are transmitted, wherein each of the plurality of portions corresponds to the first number of subframes.

8. The UE of claim 7, wherein the first configuration indicates the first number.

9. The UE of claim 7, wherein the uplink transmissions are based on adjusting frequency pre-compensation per each of the plurality of portions, wherein the frequency pre-compensation is for Doppler frequency drift in the NTN, and wherein the frequency pre-compensation is based on positioning information of the UE and satellite ephemeris information.

10. The UE of claim 7, wherein the uplink transmissions are narrowband physical uplink shared channel (NPUSCH) transmissions on a second number of subframes.

11. The UE of claim 7, wherein the processor is further configured to receive, from the base station, a second configuration of a gap between the plurality of portions, and wherein the gap is not used for transmission of the uplink transmissions.

12. The UE of claim 11, wherein the processor is further configured to transmit, to the base station, capability information on a gap length of the gap supported by the UE, and wherein the second configuration is based on the capability information.

13. A method performed by a base station (BS) in a communication system, the method comprising:

identifying a first number of subframes corresponding to a portion of an adjustment time unit for uplink transmissions in a non-terrestrial network (NTN);

transmitting, to a user equipment (UE), a first configuration of the portion; and receiving, from the UE, the uplink transmissions on a plurality of subframes corresponding to a plurality of portions, wherein the first configuration is used for configuring the UE to adjust a timing advance per each of the plurality of portions among the plurality of subframes on which the uplink transmissions are received, and wherein each of the plurality of portions corresponds to the first number of subframes.

14. The method of claim 13, wherein the first configuration indicates the first number.

15. The method of claim 13, wherein the first configuration is used for configuring to adjust frequency pre-compensation per each of the plurality of portions, wherein the frequency pre-compensation is for Doppler frequency drift in the NTN, and wherein the frequency pre-compensation is based on positioning information of the UE and satellite ephemeris information.

16. The method of claim 13, wherein the uplink transmissions are narrowband physical uplink shared channel (NPUSCH) transmissions on a second number of subframes.

17. The method of claim 13, further comprising transmitting, to the UE, a second configuration of a gap between the plurality of portions, and wherein the gap is not used for reception of the uplink transmissions.

18. The method of claim 17, further comprising receiving, from the UE, capability information on a gap length of the gap supported by the UE, and wherein the second configuration is based on the capability information.

19. A base station (BS) in a communication system, the BS comprising:

a transceiver; and a processor coupled with the transceiver and configured to:

identify a first number of subframes corresponding to a portion of an adjustment time unit for uplink transmissions in a non-terrestrial network (NTN), transmit, to a user equipment (UE), a first configuration of the portion, and receive, from the UE, the uplink transmissions on a plurality of subframes corresponding to a plurality of portions, wherein the first configuration is used for configuring the UE to adjust a timing advance per each of the plurality of portions among the plurality of subframes on which the uplink transmissions are received, and wherein each of the plurality of portions corresponds to the first number of subframes.

20. The BS of claim 19, wherein the first configuration indicates the first number.

* * * * *